US009244282B2

(12) United States Patent
Etienne et al.

(10) Patent No.: US 9,244,282 B2
(45) Date of Patent: Jan. 26, 2016

(54) CURVED BEZEL-CONCEALING DISPLAY DEVICE COVERS AND BEZEL-FREE DISPLAY DEVICES

(71) Applicant: Corning Incorporated, Corning, NY (US)

(72) Inventors: Michael Etienne, Corning, NY (US); Jacques Gollier, Painted Post, NY (US); Daniel Aloysius Nolan, Corning, NY (US); Wendell Porter Weeks, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 525 days.

(21) Appl. No.: 13/647,793

(22) Filed: Oct. 9, 2012

(65) Prior Publication Data

US 2013/0271957 A1 Oct. 17, 2013

Related U.S. Application Data

(60) Provisional application No. 61/546,296, filed on Oct. 12, 2011.

(51) Int. Cl.
| | | |
|---|---|---|
| G02B 23/16 | (2006.01) | |
| G02B 27/09 | (2006.01) | |
| G02B 27/10 | (2006.01) | |
| G02B 5/04 | (2006.01) | |

(52) U.S. Cl.
CPC ........ G02B 27/0972 (2013.01); G02B 27/1066 (2013.01); G02B 5/045 (2013.01)

(58) Field of Classification Search
CPC ........ G02B 1/11; G02B 3/08; G02B 27/1066; G02B 27/092; G02B 27/16; G02B 5/045; G09G 3/1601

USPC ........ 359/511, 514, 625, 609, 741, 742, 743; 345/60, 104; 361/679.21–679.29
See application file for complete search history.

(56) References Cited

U.S. PATENT DOCUMENTS

| 4,799,137 | A | * | 1/1989 | Aho .............................. 362/309 |
|---|---|---|---|---|
| 4,936,657 | A | * | 6/1990 | Tejima et al. .................... 349/7 |
| 7,242,536 | B2 | * | 7/2007 | Suzuki et al. ................. 359/742 |
| 2008/0158796 | A1 | | 7/2008 | Hine .............................. 361/681 |
| 2009/0079911 | A1 | * | 3/2009 | Nagato et al. ................... 349/95 |
| 2009/0322994 | A1 | * | 12/2009 | Satake et al. .................... 349/96 |

FOREIGN PATENT DOCUMENTS

| EP | 2423906 | 2/2012 | ............. G02F 1/333 |
|---|---|---|---|
| EP | 2439582 | 4/2012 | ............ G02F 1/3335 |

(Continued)

Primary Examiner — Darryl J Collins
Assistant Examiner — Journey Sumlar
(74) Attorney, Agent, or Firm — Kevin M. Able

(57) ABSTRACT

Curved bezel-concealing display covers and display devices are disclosed. In one embodiment, a bezel-concealing display cover for coupling to a display device having a bezel and a display panel includes a curved perimeter portion having a first surface and a second surface, wherein the curved perimeter portion is configured to be offset from the bezel of the display device by a varying gap $G_A$. The bezel-concealing display cover further includes an array of prisms on at least one of the first surface or the second surface of the curved perimeter portion. The array of prisms extends from an edge of the curved perimeter portion to a distance L. The array of prisms and the curved perimeter portion is configured to shift a portion of an image proximate the bezel produced by the display panel such that the shifted portion of the image appears over the bezel to an observer.

16 Claims, 23 Drawing Sheets

(56) References Cited

FOREIGN PATENT DOCUMENTS

| JP | 2004524551 | * | 8/2004 | | | |
|---|---|---|---|---|---|---|
| WO | WO 2008103931 A2 | * | 8/2008 | | | |
| WO | WO2010/140537 | | 9/2010 | ............ | G02F 1/3335 |
| WO | WO2010/122781 | | 10/2010 | ................ | G09F 9/00 |
| WO | WO 2012/004625 | | 2/2012 | ............... | C03B 17/06 |

* cited by examiner

Prism angle decreases →

.2mm

CURVED BEZEL-CONCEALING DISPLAY DEVICE COVERS AND BEZEL-FREE DISPLAY DEVICES

CROSS-REFERENCE TO RELATED APPLICATIONS

This application claims the benefit of priority under 35 U.S.C. §119 of U.S. Provisional Application Ser. No. 61/546,296 filed on Oct. 12, 2011, and U.S. Provisional Application Ser. No. 61/608,995 filed on Mar. 9, 2012, the contents of which are relied upon and incorporated herein by reference in their entirety.

TECHNICAL FIELD

The present disclosure relates to bezel-concealing display covers having a curved profile for display devices, such as televisions, and bezel-free display devices.

BACKGROUND

As used herein, the term display device is intended to encompass all devices capable of displaying visual content, including, but not limited to, computers, including laptops, notebooks, tablets and desktops, mobile telephones, and televisions (TV). Each of the foregoing devices include many component parts including the physical case or cabinet in which individual components may reside, circuit boards, circuit elements such as integrated electronic components, and of course the display panel itself. Currently, these display panels are flat display panels comprising liquid crystal display elements, organic light emitting diode (OLED) display elements, or plasma display elements, and of course the glass or plastic substrates on which many of these elements are disposed and/or enclosed by. Typically, the edge portions of the flat display panels and the display device itself are utilized for electrical leads and various other electronic components associated with the operation of the display panel, such as circuits that drive the panel pixels as well as LED illuminators in the case of a liquid crystal display (LCD) display panel. This has resulted in flat display panel manufacturers encasing the edge portions within and/or behind a bezel, which serves to conceal the foregoing components, but also obscures the edge portions of the display panel thereby reducing the overall image size.

For aesthetic reasons, flat panel display makers are trying to maximize the image viewing area and provide a more aesthetically pleasing appearance, and accordingly minimize the size of the bezel surrounding the image. However, there are practical limits to this minimization, and current bezel sizes are in the order of 3 mm to 10 mm in width. Therefore, to achieve the ultimate goal of no bezel at all, an optical solution has been proposed that will give the observer the impression that the image is occupying the entire panel surface while simultaneously reducing a gap between the image-forming display panel and a display cover.

SUMMARY

Generally, embodiments described herein are directed to curved bezel-concealing display covers that provide a substantially bezel-free appearance to a display device. The bezel-concealing display device shifts portions of an image that are close to the bezel of the display device such that those portions appear over the bezel to an observer, thereby minimizing the appearance of the bezel.

In one aspect, a bezel-concealing display cover for coupling to a display device having a bezel and a display panel includes a curved perimeter portion having a first surface and a second surface, wherein the curved perimeter portion is configured to be offset from the bezel of the display device by a varying gap $G_A$. The bezel-concealing display cover further includes a first array of prisms on at least one of the first surface or the second surface of the curved perimeter portion. The first array of prisms extends from an edge of the curved perimeter portion to a distance L. Each prism of the first array of prisms has a prism angle θ. The first array of prisms and the curved perimeter portion is configured to shift a portion of an image proximate the bezel produced by the display panel such that the shifted portion of the image appears over the bezel to an observer.

In some examples, the curved perimeter portion includes a concave curve relative to the display panel such that the gap $G_A$ decreases in a direction from the edge of the curved perimeter portion toward a center of the bezel-concealing display cover to the distance L. Some examples include a central region bounded by the curved perimeter portion, wherein the gap $G_A$ between the central region and the display panel is about zero when the bezel-concealing display cover is coupled to the display device. A tangent to the curved perimeter portion at the edge of the curved perimeter portion has an angle relative to a plane of the display panel equal to or less than 20, in some examples. In some examples, the first array of prisms is positioned on the first surface of the curved perimeter portion, and the first surface of the curved perimeter portion faces the observer. The bezel-concealing display cover further may also include a second array of prisms on the curved perimeter portion, wherein the first and second arrays of prisms are positioned on the first and second surfaces of the curved perimeter portion, respectively. A spatial frequency of individual prisms of the first array of prisms may be different than a spatial frequency of individual prisms of the second array of prisms.

In some examples, the curved perimeter portion includes a convex curve relative to the display panel such that the gap $G_A$ increases in a direction from the edge of the curved perimeter portion toward a center of the bezel-concealing display cover to a length L. The prism angle θ of the first array of prisms may decrease from a maximum prism angle $θ_1$ at the edge of the display device. In some examples, the curved perimeter portion further includes a first straight portion extending from a surface of the bezel, a convex curved portion extending from an end of the first straight portion, wherein the first array of prisms is located at the convex curved portion, and a second straight portion extending from an end of the convex curved portion and parallel to the display panel. The first straight portion may be angled with respect to a plane perpendicular to the bezel in some embodiments. The first array of prisms may be positioned on the second surface of the curved perimeter portion, and the second surface of the curved perimeter portion faces the display panel. In some instances the prisms can be located on the second face of the cover, wherein a first facet of the prism is within +/−20 degrees of perpendicular relative to the light propagating in the prism, and a second facet of the prism is within +/−20 degrees of parallel to light propagating in the prism.

In some examples, the curved perimeter portion includes a convex curve portion and a concave curve portion such that the concave curve portion extends from the edge of the display device proximate the bezel such that a maximum gap $G_A$ occurs within the concave curve portion, and the convex curve portion extends from the concave curve portion, wherein there is no gap at a termination of the convex curve portion.

In another aspect, a display device includes a bezel-concealing display cover, a backlight, a display panel, and a bezel having a width W disposed about a perimeter edge of the display panel. The bezel-concealing display cover includes a curved perimeter portion and a central region bounded by the curved perimeter portion, a first surface and a second surface, and a first array of prisms disposed on at least one of the first surface or the second surface, wherein the first array of prisms extends from an edge of the bezel-concealing display cover toward the central region of the bezel-concealing display cover to a distance L. The display panel is positioned between the backlight and the bezel-concealing display cover such that a gap $G_A$ is present between the display panel and the second surface of the bezel-concealing display cover. The display panel is configured to display an image. The curved perimeter portion curves inward toward the display panel, and the gap $G_A$ is substantially zero after the distance L.

In some examples, the display device further includes a polymer material disposed between the curved perimeter portion and the display panel, wherein the polymer material includes a diffusing particulate material dispersed therein. In some examples, the bezel-concealing display cover includes a second array of prisms on the curved perimeter portion, wherein the first and second arrays of prisms are positioned on the first and second surfaces of the curved perimeter portion, respectively.

In yet another aspect, a display device includes a bezel-concealing display cover, a backlight, a display panel, and a bezel having a width W disposed about a perimeter edge of the display panel. The bezel-concealing display cover includes a curved perimeter portion and a central region bounded by the curved perimeter portion, a first surface and a second surface, and an array of prisms disposed on at least one of the first surface or the second surface, wherein the array of prisms extends from an edge of the bezel-concealing display cover toward the central region of the bezel-concealing display cover to a distance L. The display panel is positioned between the backlight and the bezel-concealing display cover such that a gap $G_A$ is present between the display panel and the second surface of the bezel-concealing display cover. The display panel is configured to display an image. The curved perimeter portion curves outward away from the display panel, and maximum gap $G_A$ occurs after the distance L.

In some examples, a prism angle θ of individual prisms of the array of prisms decreases from a maximum prism angle $θ_1$ at the edge of the display device. The array of prisms may be positioned on the second surface of the curved perimeter portion, and the second surface of the curved perimeter portion faces the display panel, in some examples.

In some embodiments the display cover is curved only in the left and right regions of the display, where left and right denote positions relative to an imaginary vertical line bisecting the display cover.

Prism arrays may be located on the second surface of the cover in the curved left and right regions, while other prisms may be located on the first surface of the display cover in the straight (non-curved) top and bottom regions of the display cover.

It should be understood that the present disclosure includes embodiments comprising an array of display devices positioned side-by-side ("tiled") in either a horizontal, or a vertical direction.

BRIEF DESCRIPTION OF THE DRAWINGS

These and other aspects are better understood when the following detailed description is read with reference to the accompanying drawings, in which.

DETAILED DESCRIPTION

Figure 1A:
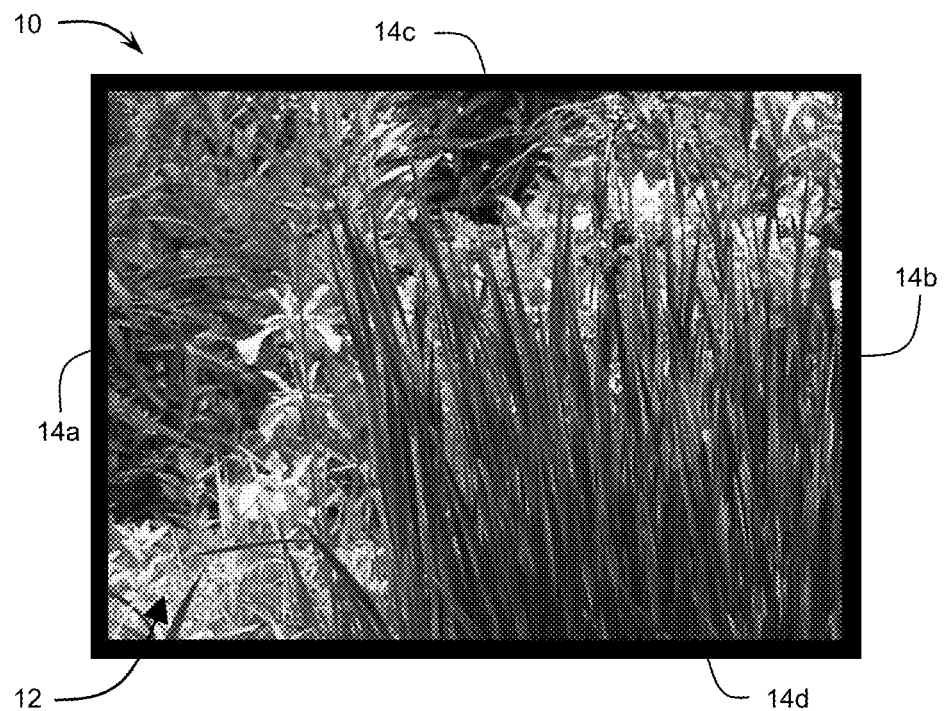
FIG. 1A is a front view of a display device comprising a display panel and a bezel.

Examples will now be described more fully hereinafter with reference to the accompanying drawings in which example embodiments are shown. Whenever possible, the same reference numerals are used throughout the drawings to refer to the same or like parts. However, aspects may be embodied in many different forms and should not be construed as limited to the embodiments set forth herein.

The aesthetics of display devices, such as television display panels, computer monitors, and laptop display panels, are affected by the size and appearance of a bezel that exists around a perimeter of such display devices. The bezel of a display device may be used, for example, to house electronics for driving the pixels of the display panel, as well as, in certain instances, to provide backlighting for the display device. For example, an LCD television display panel may include a plurality of backlighting light emitting diodes (LEDs) maintained within the bezel region of the display device.

The trend over the last few years has been toward smaller and smaller bezels. Current bezel widths are in the order of 3.0 mm to 10 mm. However, television models having very large display panels have achieved bezel regions having a width as small as 2 mm on at least two borders and 4 mm on the other two borders. However, the presence of a bezel, even though small, is still distracting, especially when the display devices are assembled in a tiled arrangement to form a very large displayed image. The bezels of such tiled display devices give the undesirable appearance of an image "grid," rather than a cohesive large image without seams. The eye is very sensitive to the presence of a black line separating tiled display devices, which makes such an image unsightly.

Embodiments of the present disclosure include shaped bezel-concealing display covers having a curved perimeter with one or more arrays of prisms that conceal the bezel so that its presence is not visible, or at the least not noticeable to the observer within a predictable viewing angle. Such display covers can be formed from glass, for example. In some embodiments, the glass can be a chemically strengthened glass.

Figure 1B:
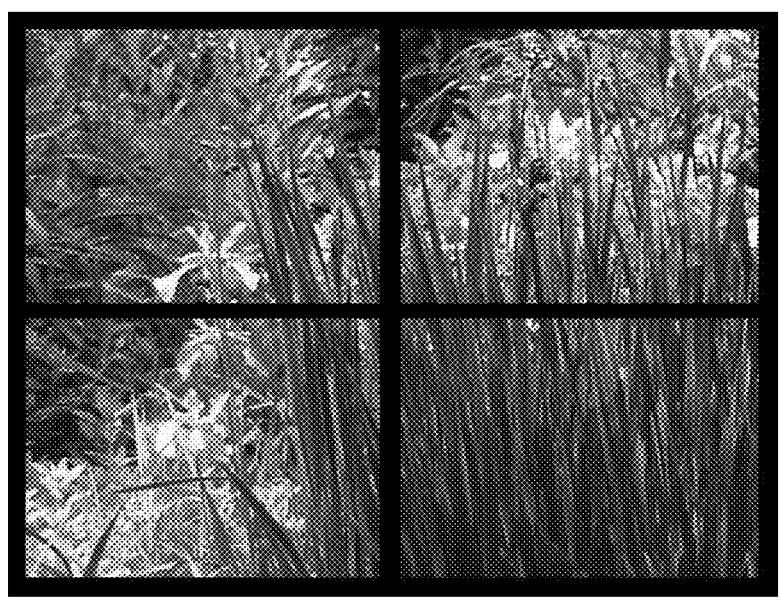
FIG. 1B is a front view of a tiled array of display devices.

Referring now to FIG. 1A, a display device 10 configured as a flat display panel television is illustrated. While the following description is primarily in terms of televisions, it should be noted that embodiments described herein may be suitable for other display devices and therefore the described embodiments are not limited to televisions. Display device 10 comprises a display panel 12 that has a bezel 14 positioned around its perimeter. Bezel 14 comprises bezel portions 14a-14d. The bezel portions 14a-14d may enclose display drive electronics, as well as backlighting hardware to backlight the display panel portion 12, such as edge light emitting diodes (LEDs). The bezel portions 14a-14d may have a particular width, such as between 3 mm and 10 mm, for example. The bezel portions 14a-14d may be distracting to a viewer, particularly if several display devices are arranged in a matrix in order to view the entire image, as illustrated in FIG. 1B.

Figure 2:
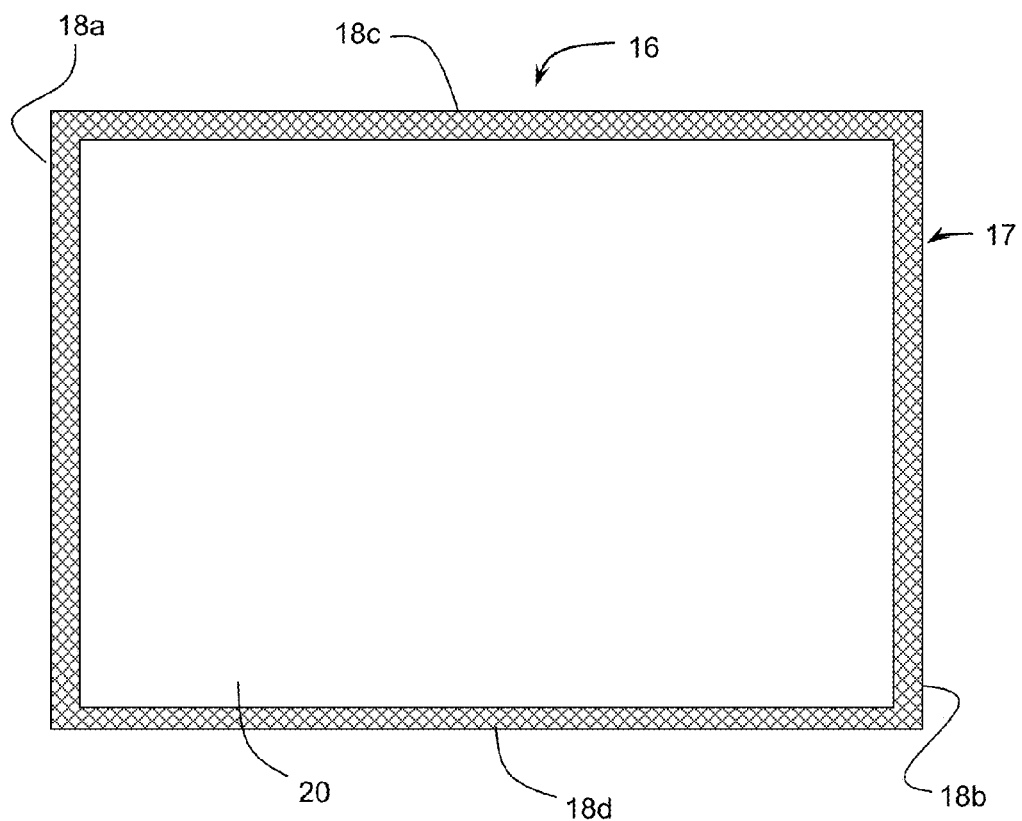
FIG. 2 is a front view of a bezel-concealing display cover including prism regions for concealing a bezel.

FIG. 2 schematically depicts a bezel-concealing display cover 16 according to one embodiment. The bezel-concealing display cover 16 of the illustrated embodiment is configured to be mechanically coupled to a display device (e.g., a display device 10 as illustrated in FIG. 1A). The bezel-concealing display cover 16 should be mounted on the display device 10 such that there is a gap (e.g., a low index gap or an air gap) between the bezel-concealing display cover 16 and the surface of the display device 10. In one embodiment, the bezel-concealing display cover 16 is coupled to the display device 10 by transparent pillars (not shown) at the corners of the bezel-concealing display cover 16.

The bezel-concealing display cover 16 may, for example, comprise a perimeter portion 17 including four prism portions 18a-18d adjacent to the perimeter of the display cover.

As described in more detail below, prism portions 18a-18d comprise many prisms arranged in an array that act as a light bending (refracting) filter to the regions of the display panel 12 that are positioned behind the bezel portions 14a-14d relative to the observer. The display cover and the light bending filters provided by the prism portions 18a-18d make it possible to conceal the bezel so that its presence is not visible, or at least not readily apparent to the observer within a predictable viewing angle.

In some embodiments, the bezel-concealing display cover 16 may further comprise a visually transparent central region 20 bounded by the prism portions 18a-18d that does not contain any prisms and is therefore substantially flat. In other embodiments, the bezel-concealing display cover 16 does not include a central region such that only a frame defined by the perimeter portion 17 is provided.

The bezel-concealing display cover 16 may be made of glass. For example, the glass may be a chemically strengthened glass such as an ion exchanged glass, an acid-washed glass, or both. Prism portions 18a-18d may, for example, be made from a commercially available light bending filter material that can be adhered to the display cover, such as Vikuiti image directing film (IDF II) manufactured by the 3M Company. It should be understood that Vikuiti is but one of many possible light bending filter solutions, and is presented herein as a non-limiting example only. In another example, light bending filters may be incorporated directly into display cover 16. For example, prisms may be formed directly in the display cover material. As described in more detail below, specialized light bending filters may be optimized and developed for the purpose of concealing the bezel from an observer. It is noted that a gap of approximately 2.7 times the desired lateral image shift may be needed when using the Vikuiti light bending filter.

In another embodiment, the prisms can also be part of a frame surrounding the display and made of a transparent material such as plastic or glass. The frame can be produced, for example, by injection molding and the mold itself can include the microprism structure necessary to produce the desired optical effect. In such embodiments, the central region 20 may be free space.

Figure 3A:
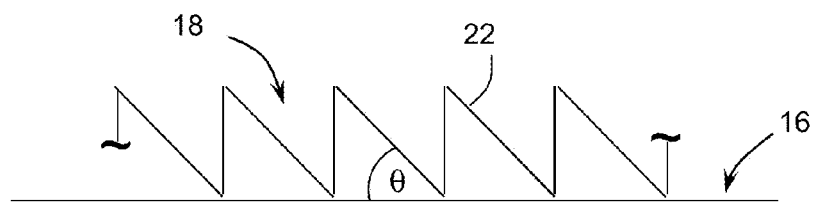
FIG. 3A is a schematic diagram of a portion of a prism region showing individual prisms.
Figure 3B:
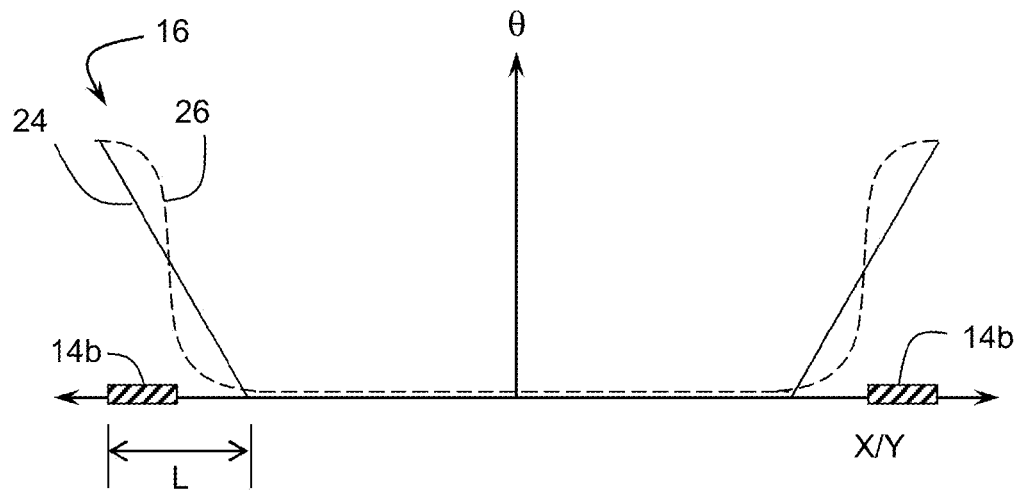
FIG. 3B is a graph showing the prism angle θ as a function of position on a display device.

Referring now to FIG. 3A, a portion of a prism portion 18 positioned on a bezel-concealing display cover 16 is illustrated. The prism portion 18 comprises many prisms 22 that are triangularly shaped. The prisms 22 are positioned on an outside surface of the display cover 16 (facing an observer) in the figure. The prisms 22 include a prism angle $\theta$ that cause the image near the bezel to be shifted, wherein the prism angle is the angle bounded by the faces (facets) of the prism through which light predominantly transits the prism. FIG. 3B is a graph showing the prism angle $\theta$ as a function of position on the display device 10. Generally, the angle $\theta$ of the prisms 22 should be at a maximum at the edge of the bezel-concealing display cover 16 and fall to zero (i.e., no prisms at all) away from the edges of the display cover. Accordingly, only a small portion of the image produced by display panel 12 will be shifted. The frequency of the array of prisms, that is the periodicity of the prisms, should be greater than the frequency of the pixels of the display panel to prevent aliasing in the resulting image. Generally, the prisms should have a size that is smaller than the pixels of the display panel. For example, the individual prisms may be as small as 1/10 the size of a single pixel of the display panel.

Solid curve 24 depicts an example in which the angle $\theta$ of the prisms decreases linearly from the edges of the bezel-concealing display cover 16 and falls to zero at the central region over a distance L. Dashed curve 26 depicts an example in which the angle $\theta$ of the prisms vary non-linearly over distance L. The more complicated profile of dashed curve 26 may be considered with the aim of avoiding disturbing image discontinuities.

Figure 4:
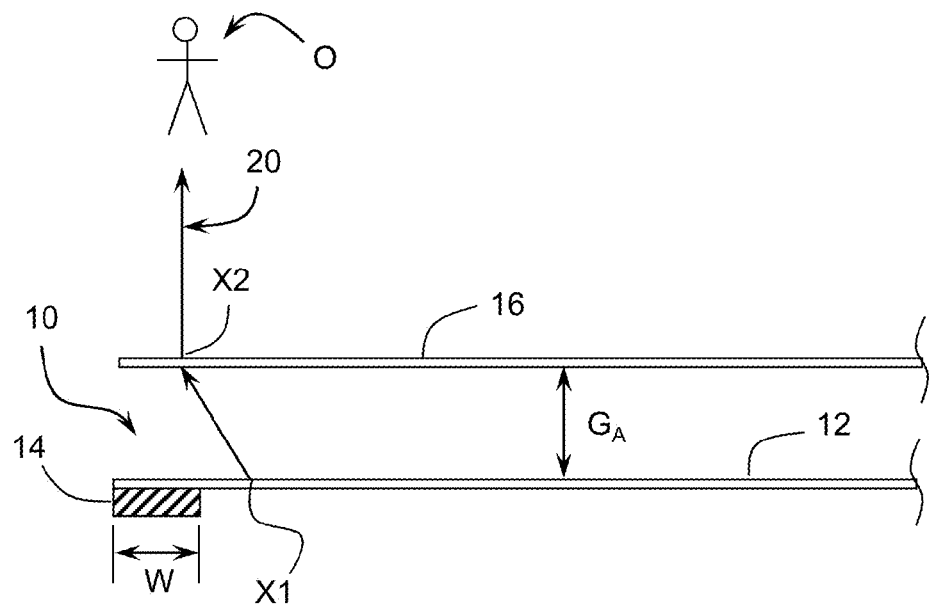
FIG. 4 schematically illustrates an observer located far away from a display panel of a display device that is covered with a bezel-concealing display cover.

FIG. 4 schematically illustrates an observer O located far away from a display panel 12 of a display device 10 wherein a bezel-concealing display cover 16 is positioned between the display panel and the observer O. A gap $G_A$ exists between the bezel-concealing display cover 16 and the display panel 12. The simulation traces light rays emitted from the display panel 12 to the observer O and indicates, for a given position X1 on the display panel 12, the position X2 where the light ray hits the bezel-concealing display cover 16. In one simulation, the prisms face the observer O, and the prism angle of the prisms vary linearly from 32° at the very edge of the bezel-concealing display cover 16 (i.e., above a portion of bezel 14) to 0° about 10 mm away from the outer edge of display cover 16. The index of refraction of the bezel-concealing display cover 16 in the simulation was 1.5, and the gap $G_A$ was about 15 mm.

Figure 5:
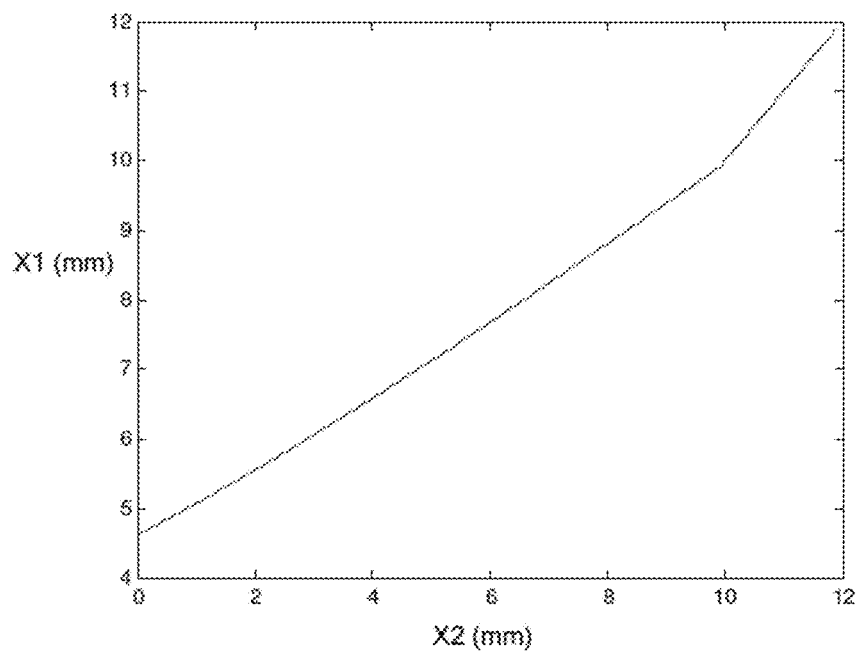
FIG. 5 is a plot of a position on the display device versus a position on the bezel-concealing display cover.

FIG. 5 is a graph of simulation results showing that, at the very edge of the bezel-concealing display cover 16 (X2=0), the position X1 on the display panel 12 of the display device 10 seen by the observer O is about 4.8 mm away from the edge of the display cover 16. Accordingly, the bezel 14 will be invisible to an observer if the size (width) is smaller than 4.8 mm.

Figure 6:
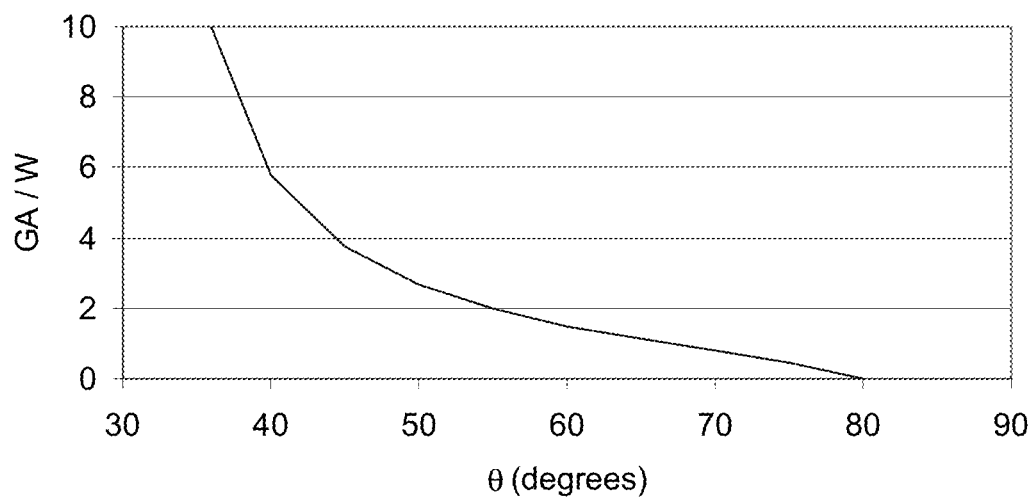
FIG. 6 is a plot of the ratio of gap distance D to bezel width W as a function of prism angle θ.

The amount of beam deviation that can be produced by a prism is a function of the angle $\theta$ of the prism. The graph depicted in FIG. 6 shows the ratio of gap $G_A$ to bezel width W as a function of prism angle $\theta$ assuming a refractive index of 1.5, and further assuming the bezel is to remain essentially invisible for a viewing angle of 20°. As an example and not a limitation, by using a prism angle $\theta$ of 45 degrees, the gap needs to be at least 4 times the width of the bezel (a $G_A/W$ ratio of 4).

Introduction of the bezel-concealing display covers described herein may introduce artifacts and/or distortions in the image displayed by the display device that may be visible to an observer. Described below are several image artifacts that may be introduced, as well as design parameters that may be optimized to minimize the appearance of such image artifacts and/or distortions.

Figure 12:
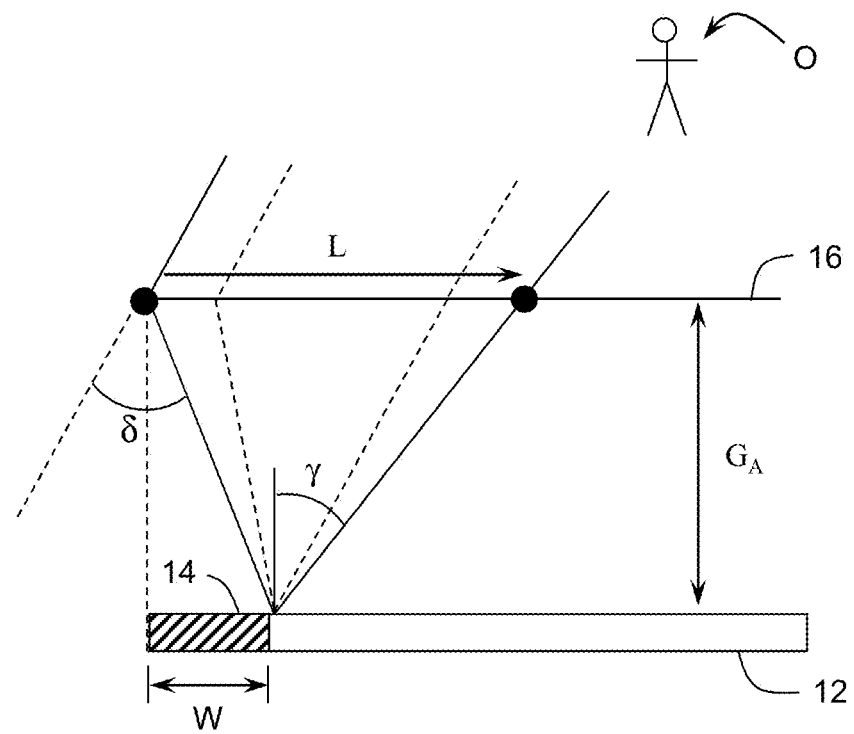
FIG. 12 is a schematic view of a display panel and bezel, and a flat bezel-concealing display cover comprising an array of prisms distributed over a length L from an edge of the bezel-concealing display cover.

The localized light bending filters provided by the preceding examples of a bezel-concealing display cover 16 near the bezel of a display device, such as display device 10, may produce local image magnification. A first impact of that local magnification is to introduce image deformation that can be compensated in part by using image distortion correction algorithms. Image distortion correction algorithms may manipulate the image displayed by the display panel 12 to minimize the appearance of magnification. However, because the distortion in the image is a function of the viewing angle $\gamma$ (e.g., as shown in FIG. 12), the image can only be compensated for a given angle of vision (e.g., when the display is being viewed at normal incidence or some other static viewing angle $\gamma$).

Figure 7:
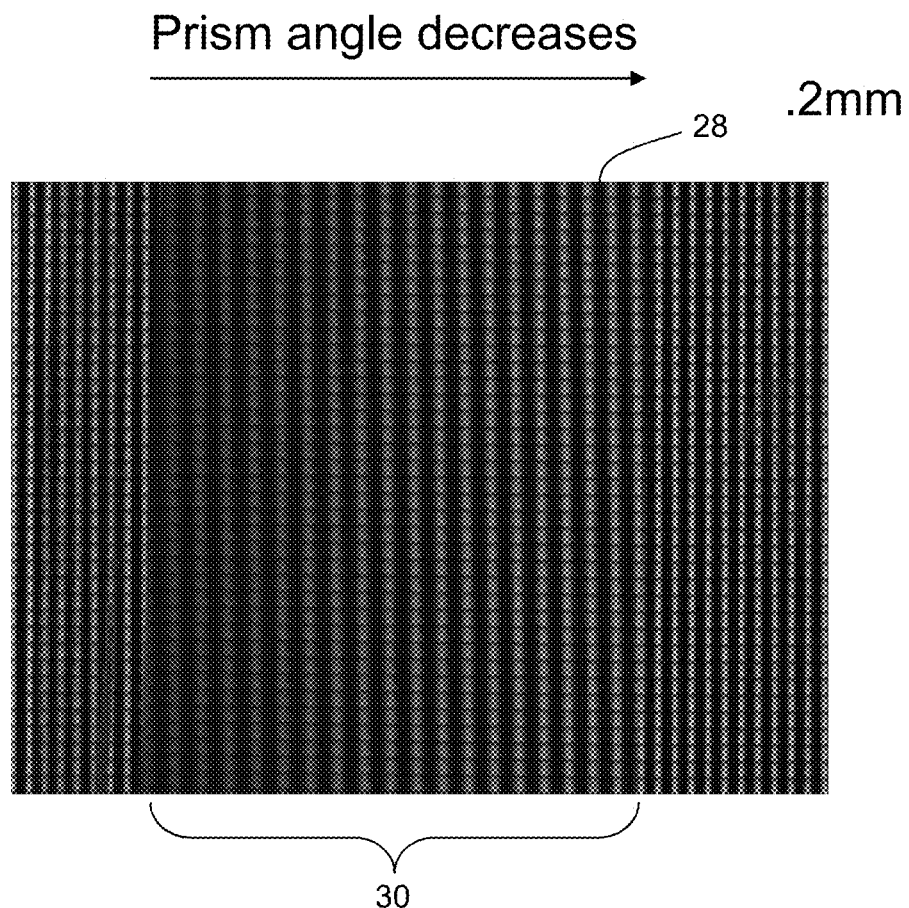
FIG. 7 is a view of an image as seen through a portion of a display cover comprising prisms, and showing localized image magnification (banding) at the prism location.

Another image artifact related to local magnification is that the image of individual pixels may be highly magnified, resulting in the introduction of colored or black bands into the image. FIG. 7 illustrates the case where the image is locally magnified by using a varying angle prism structure placed in front of a pixilated screen. Due to the magnification, broad dark 28 bands within region 30 resulting from the space between the pixels is highly magnified, thereby resulting in visibly noticeable black lines in the image. This effect is referred to as "banding".

Figure 8:
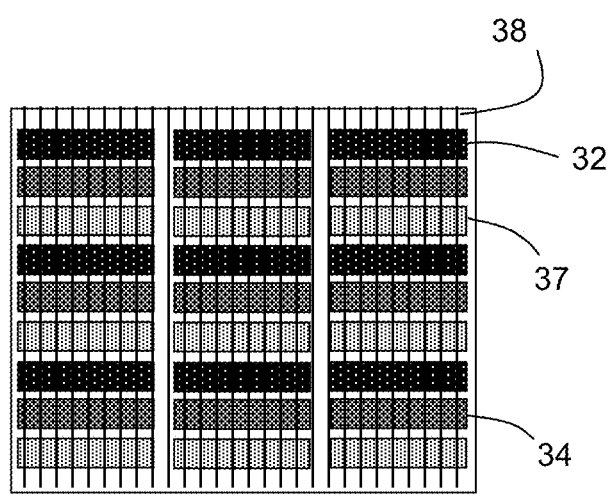
FIG. 8 is a schematic view of an array of red, green, and blue (RGB) pixels wherein the pixels are arranged orthogonal to the long axis of the prisms of the prism array to reduce banding.
Figure 9:
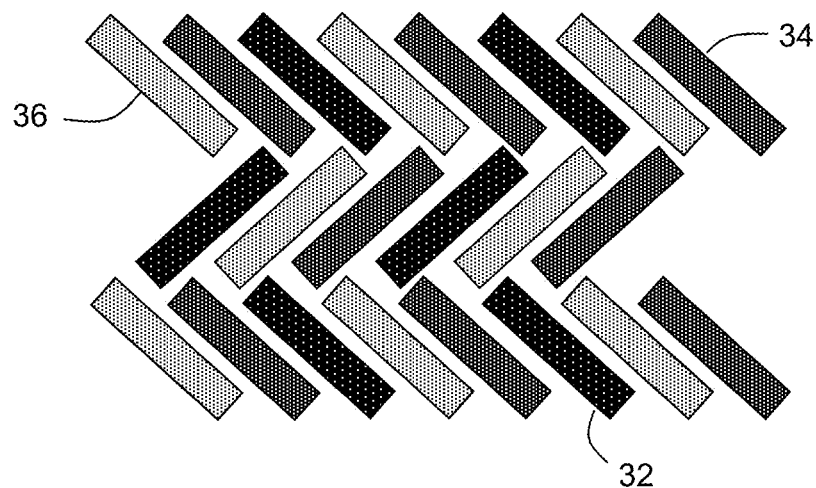
FIG. 9 is a schematic view of an array of RGB pixels arranged to reduce banding.

As an example, banding may be reduced or eliminated by minimizing the space between pixels of the same color. FIG. 8 depicts an example where the red, green and blue pixels (32, 34 and 36, respectively) of the display panel 10 are aligned orthogonal to the long axis 37 direction of the prisms. Another approach is depicted in FIG. 9. This approach comprises aligning the pixels (e.g., the red, green and blue pixels, 32, 34 and 36, respectively) at a large angle with respect to one another (e.g., approximately 45 degrees) and shifting the colors every other line. In that case, the colored or black bands are shifted every other line and therefore become less visible.

Additionally, the size of the individual pixels may be manipulated to minimize the effects of magnification. A typical single pixel size in a large display, such as a 55 inch (about 1.4 m) diagonal display, is about 0.7 mm, depending on the resolution, meaning that at a magnification factor of 5, pixels are readily visible. This can be avoided by making the pixels of the display panel smaller or to have different geometries. For a magnification factor of 5, utilizing sub-pixels that would be 5 times smaller would eliminate perceived banding. From an electronic point of view, each set of sub-pixels may still be driven by the same transistor, thereby avoiding more complex electronic circuitry.

Figure 10:
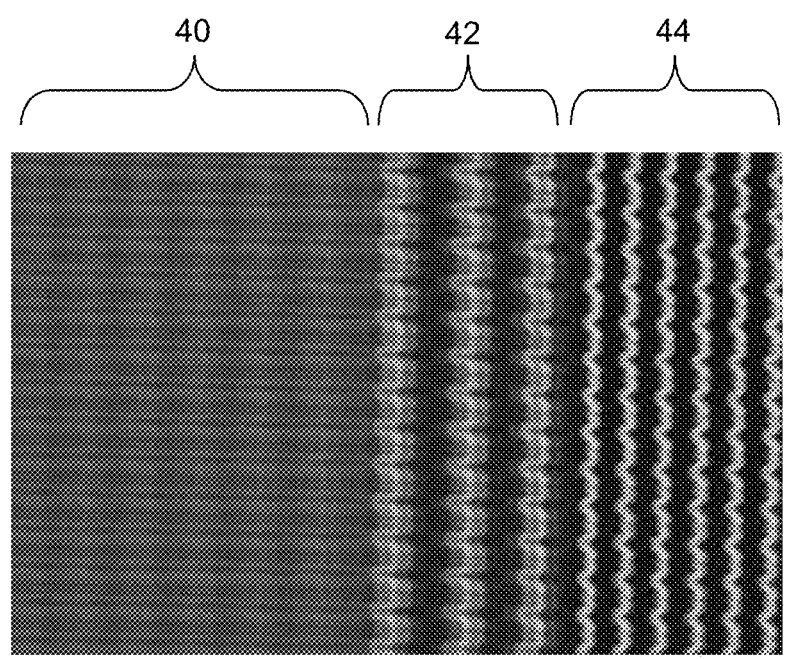
FIG. 10 is a view of a portion of an image as seen through a display cover comprising prisms, showing a portion with no prisms, a portion with prisms but without localized blurring and a portion with prisms and localized blurring.
Figure 11:
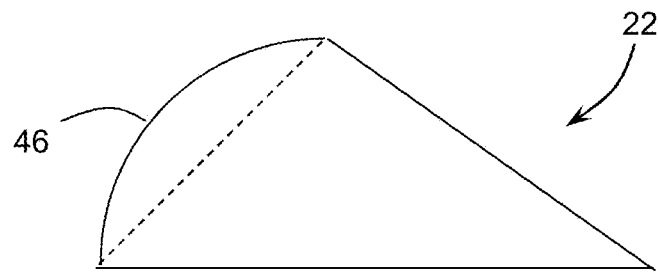
FIG. 11 is a schematic view of a prism comprising a curved front facet.

The bezel-concealing display cover may also be modified to reduce or eliminate banding. For example, banding may be reduced or eliminated by making the image of single pixels slightly blurry by introducing a roughness on the facets of the prisms, or by making those surfaces slightly curved instead of flat (i.e., adding a lens component to the prism). Suitable roughness can be obtained, for example, by diamond turning technology for creating a master and micro replication of the master. FIG. 10 depicts an image where a portion 40 of the prisms had curvature (partly blurred zone), and another portion 42 wherein the prisms had only flat facets (no blurring zone). As can be seen, the broad dark lines between the pixels are eliminated in portion 42. Portion 44 is seen without prisms. FIG. 11 is a schematic illustration of a prism 22 comprising a curved portion 46.

When the observer does not view the display device 10 at normal incidence, the bezel 14 may be partly or wholly visible to the observer. Particularly, when the observer O is located very close to the display device 10, the observer will view all of the edges of the display cover at high angles of incidence, which may make all of the bezel portions visible and may give an impression, for example, of a television inside a box.

In some embodiments, a reduction in the visibility of the bezel at an increased viewing angle may be accomplished by adding a diffusing texture on the prism portions 18a-18d of the bezel-concealing display cover 16. The image may be partially blurred in this region close to the bezel portions 14a-14d because that part of the image is generated on the bezel-concealing display cover 16 itself. However, having a 10 mm blurred area for a large television may not be a significant visual distraction because observers usually fix their attention near the center of the image, and peripheral information is not as significant. In some examples, prism portions 18a-18d may have prisms on each side of the bezel-concealing display cover 16 to enlarge the viewing angle.

Referring now to FIG. 12, consider that the observer O is looking at the display device 10 (e.g., a television) at a viewing angle of γ relative to a normal to display panel 12. To ensure bezel 14 is not seen at viewing angle γ, the deviation angle δ introduced by prisms 22 positioned on display cover 16 needs to be:

$$\delta = \gamma + \arctan(W/G_A) \quad (1)$$

or $$G_A = W/\tan(\delta - \gamma)$$

where δ is the prism deviation angle, γ is the viewing angle, W is the bezel width, and $G_A$ is the distance of the gap between display panel 12 and display cover 16. FIG. 12 also shows that the minimum distance L over which prisms should be positioned extending from the edge of the display cover toward an interior of the display cover is:

$$L = W + G_A \tan(\gamma) \quad (2)$$

Figure 13:
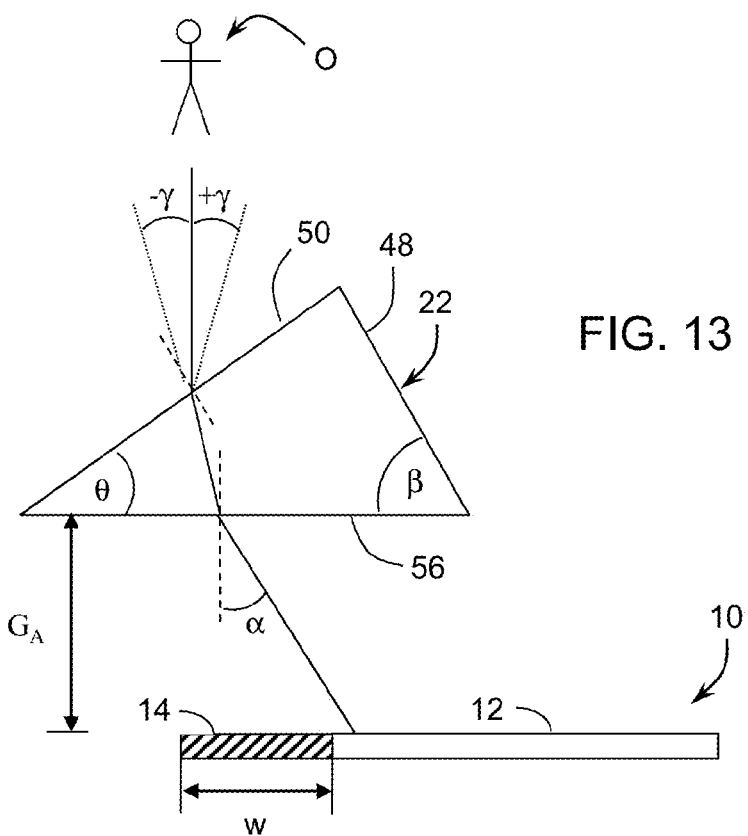
FIG. 13 is a schematic view of a display panel and bezel, and a single prism of the array of prisms of FIG. 12 illustrating positive and negative viewing angles and gap $G_A$.

Equation 1 shows that gap $G_A$ will decrease as the prism deviation angle δ is increased or the viewing angle γ is decreased, meaning the bezel 14 will become visible to the observer at a smaller viewing angle. Also, Equation 2 shows the needed length L of the distribution of prisms 22 from the edge of the display cover to conceal the bezel will decrease for small gaps $G_A$, meaning that image artifacts remain localized within a small portion of the image close to the edges of the display device. Referring now to FIG. 13, an observer O is depicted as viewing a display device 10 having a display panel 12 surrounded by a bezel 14 having a width W. A single prism 22 of an array of prisms is illustrated. The prism 22 has a front facet 56, a non-transiting facet 48, and a back facet 50. The back facet 56 and the front facet 50 define a prism angle θ. Assuming prisms 22 are facing the observer O (on the observer side of the glass cover), the deviation angle δ can be calculated relative to prism angle θ and the gap to bezel width ratio $G_A/W$ determined while fixing the viewing angle to different values.

Figure 14:
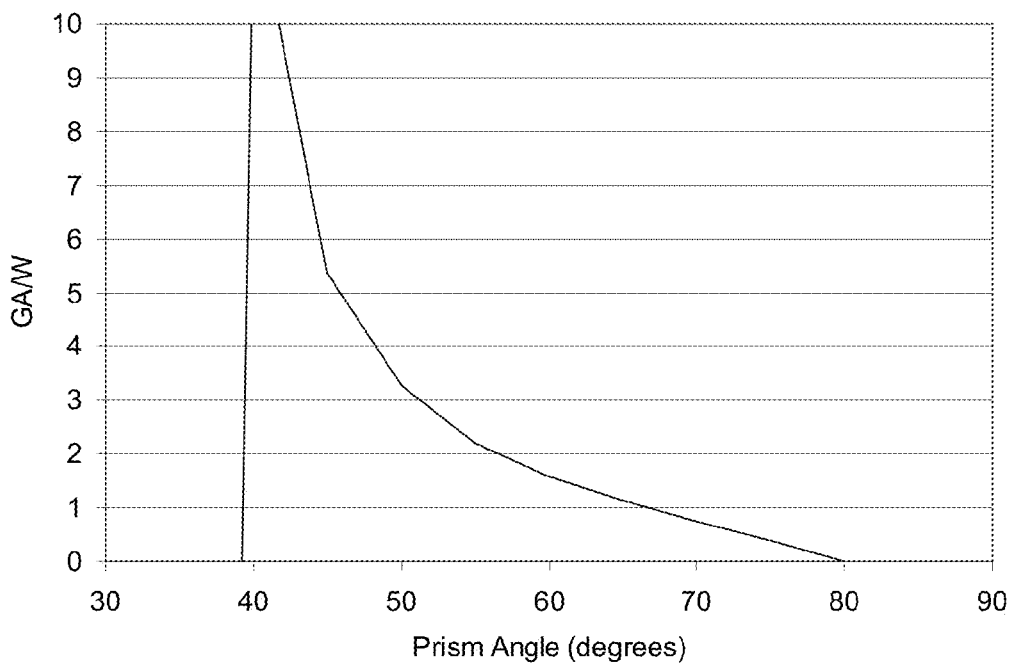
FIG. 14 is a graph of the gap/bezel width ratio as a function of prism angle θ.

FIG. 14 is a graph depicting the minimum gap—bezel width ratio $G_A/W$ by assuming it is desirable to maintain the bezel invisible up to a positive viewing angle +γ of +30 degrees. An index of refraction for the prisms was assumed as 1.56. As can be seen from FIG. 14, prism angle θ should be at least 55° to maintain the bezel invisible to the observer and keep a reasonable gap $G_A$. An optimal design for the configuration of the bezel-concealing display cover 16 may be a function of other image artifacts described in more detail below.

Figure 15:
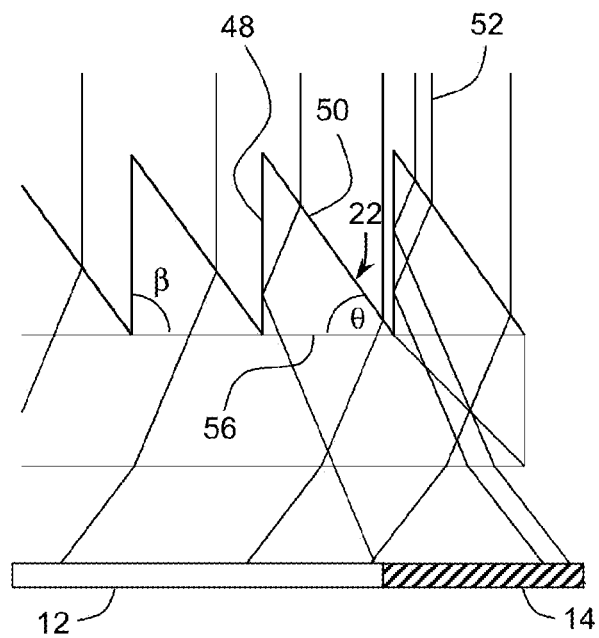
FIG. 15 is a schematic view of an array of prisms disposed on an observer side of a bezel-concealing display cover illustrating internal reflection within the prisms that causes a view of the bezel.

FIG. 15 depicts a result when using prisms 22 with a small prism angle θ, and with the opposite, non-transiting facet 48 (a facet through which a ray of light does not transit) set at 90° to the adjacent, transiting front facet 50 (i.e., a right triangle formed by angle β). When viewing the display panel image along ray 52, the ray 52 is reflected by the non-transiting facet 48 through total internal reflection and is propagated in a direction such that the bezel 14 is visible. As an example, with a prism angle θ of 55°, approximately 40% of the rays entering the prism are propagated in the wrong direction.

Figure 16:
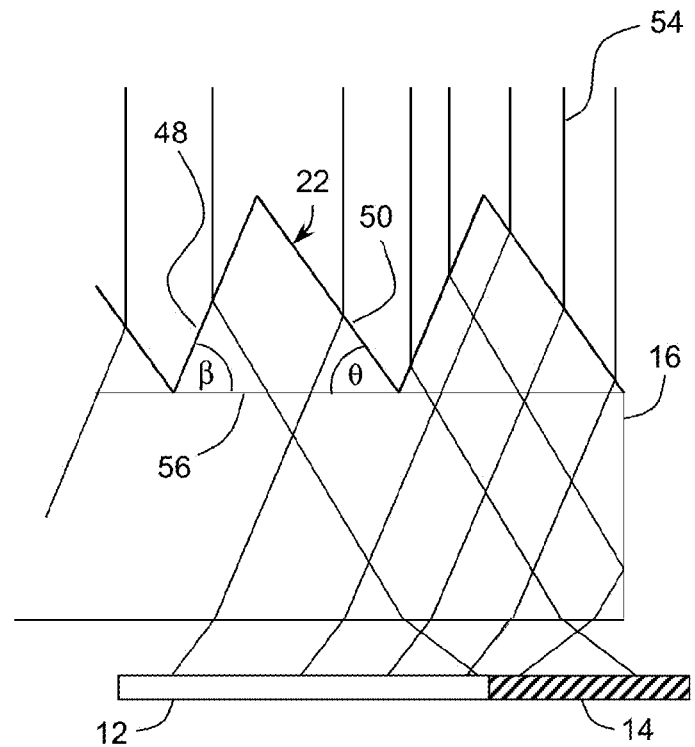
FIG. 16 is a schematic view of an array of prisms disposed on an observer side of a bezel-concealing display cover illustrating angles of the prism set so that an observer views the image through two front facets, thereby allowing a view of the bezel.
Figure 17:
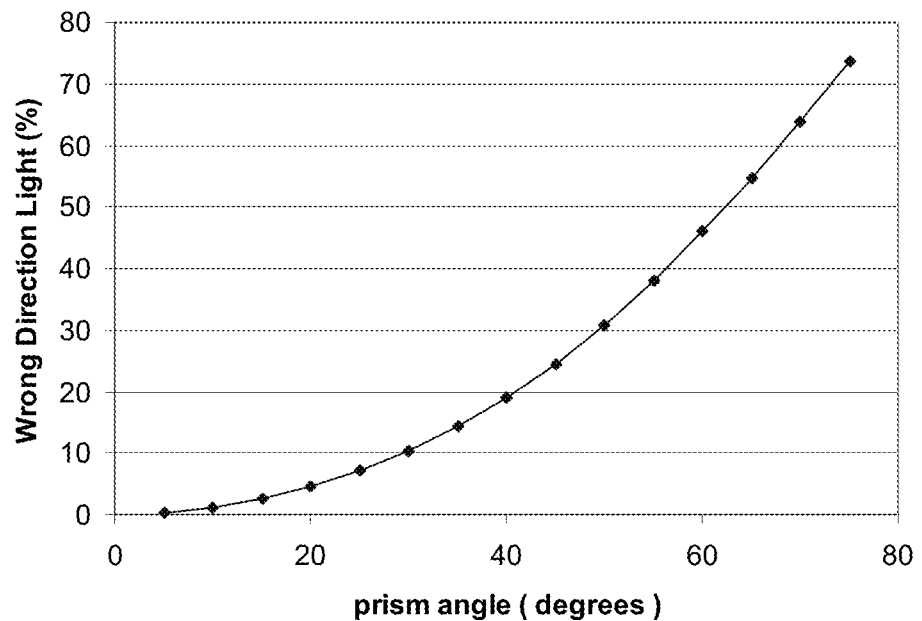
FIG. 17 is a graph of the percent observer view in a wrong direction (toward the bezel) as a function of prism angle θ.

Alternatively, the angle β of the prism 22 is such that a non-transiting facet 48 of the prism 22 is parallel to the transiting ray 54 inside the prism is shown in FIG. 16. However, that part of the light will now be directly transmitted by one of the facets 48 of prism 22 and, for a 55° prism angle θ, approximately 40% of light transiting the prism will still be propagated in the wrong direction. The graph in FIG. 17 shows the amount of light refracted in a wrong direction as a function of prism angle θ, and illustrates that for a prism angle θ of about 55°, about 40% of the rays go to the wrong facet (i.e., facet 48), meaning that the image as seen by observer O will look dimmer at the edges. While 40% may be acceptable to most observers, it is assumed an amount of wrongly-deviated light greater than 40% is not visually acceptable. Consequently, the extended image will be dimmer at its edge, and a prism angle θ of 55° is the maximum prism angle to maintain the brightness decrease below 40%.

Figure 18:
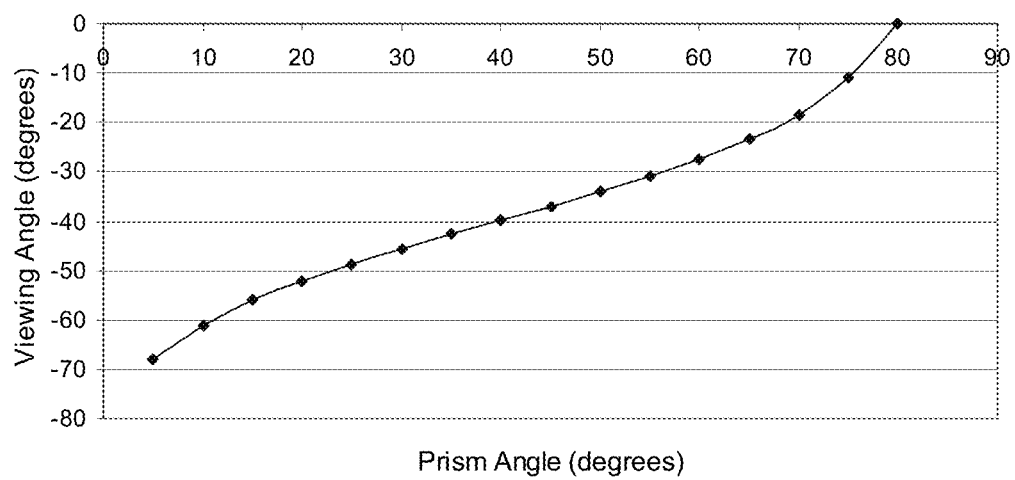
FIG. 18 is a graph of viewing angle for which total internal reflection occurs as a function of prism angle.

Referring once again to FIG. 13, when the prism 22 is facing the observer O and is positioned on a flat glass substrate, the back facet 56 (the facet at display cover 16) is parallel to the plane of display panel 12. At large negative viewing angles (−γ), the angle of incidence of a light ray at the back facet 56, becomes very large and the ray is reflected in total internal reflection at the back facet 56. The graph of FIG. 18 depicts prism angle θ as a function of the viewing angle γ for the onset of total internal reflection within a prism, and shows that for a prism angle θ of about 55°, total internal reflection begins at a viewing angle γ of about −31°. For a negative viewing angle −γ less negative than about −31°, prism 22 will look like a diffusing reflector.

Figure 19:
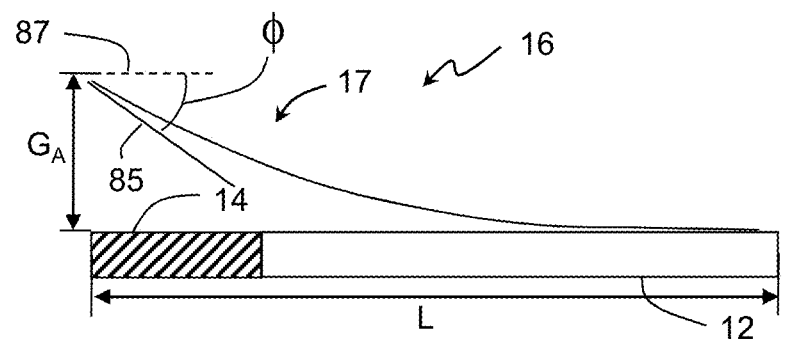
FIG. 19 is a cross sectional side view of a portion of a display panel and a bezel, and a display cover comprising a curved perimeter portion.

The bezel-concealing display covers described herein have curved perimeters such that the perimeter portion including the array of prism is curved inwardly toward the display device or outwardly away from the display device. The curved portions of the display cover may provide for flexibility in varying the angle of the prism, as well as the size of the gap $G_A$. Therefore, bezel-concealing display covers having curved perimeters may increase the visibility angle over that of bezel-concealing display covers having flat perimeters. In flat cover sheet designs, the gap $G_A$ is everywhere between the bezel-concealing display cover and the display device, which may present breakage issues because a 55 inch (about 1.4 m) thin sheet of glass may be very flexible. FIG. 19 schematically depicts a bezel-concealing display cover 16 having a perimeter portion 17 that is concave relative to the display panel 12 (i.e. the curvature of the display cover 16 curves inward toward the display panel 12) such that the display cover 16 contacts (or nearly contacts) the display panel 12 over substantially all of the surface of the display panel 12. That is, by substantially all what is meant is all the display cover is in contact (or nearly in contact) with the display panel 12 except for the curved perimeter portion 17 adjacent to the edges of the display. A variable angle φ is present between the concaved perimeter portion 17 and a plane defined by the bezel 14 and the display panel 12. Because the display cover 16 is concave, the gap $G_A$ decreases away from an edge of the display device 10 along length L.

Figure 20:
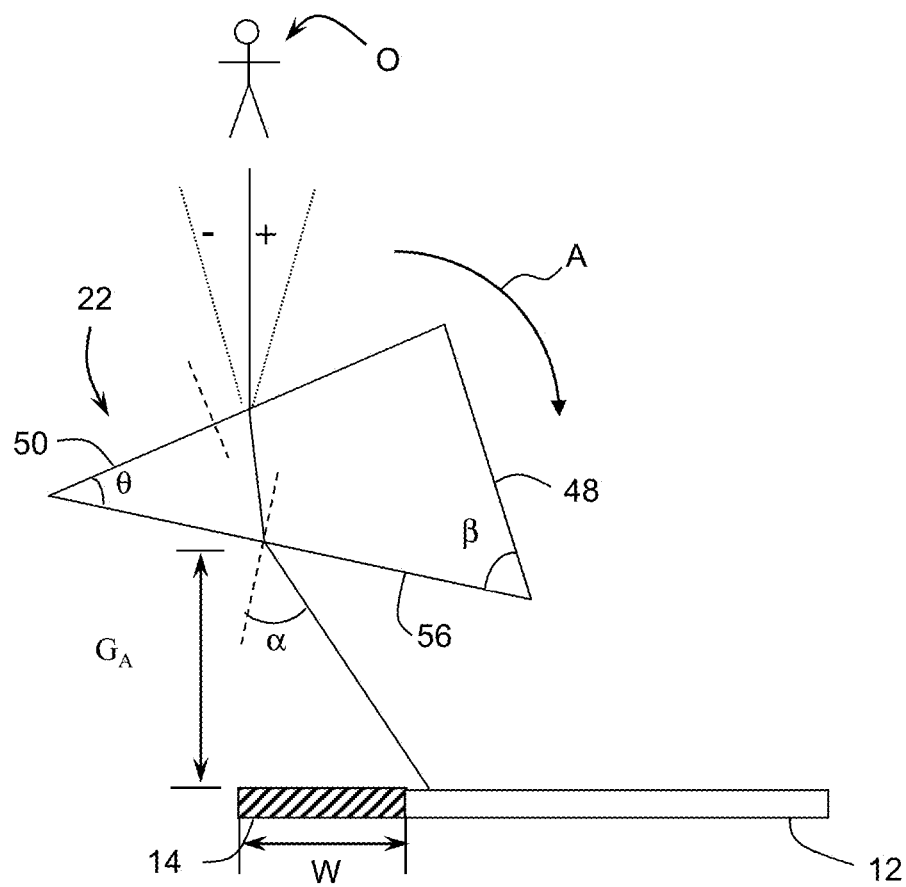
FIG. 20 is a schematic view of a single prism of a prism array disposed on the display cover of FIG. 19, showing that the prism is rotated so that no facet (surface) is parallel with the display panel.

For prisms 22 positioned on the observer side of the display cover, the geometry of the problem is similar to that in the illustrative flat display cover examples described above, except that the prisms are rotated due to the angle of the display cover at the edge. Similar to FIG. 13, FIG. 20 depicts an observer O viewing a display device 10 having a display panel 12 surrounded by a bezel 14 with a width W. A single prism 22 of an array of prisms positioned on an observer-facing surface of the concave perimeter portion 17 depicted in FIG. 12 is illustrated. The prism 22 has a back facet 56, a non-transiting facet 48, and a front facet 50. The back facet 56 and the front facet 50 define a prism angle θ. Assuming prisms 22 are facing the observer (on the observer side of the glass cover), the deviation angle δ can be calculated relative to prism angle θ and the gap to bezel width ratio GA/W determined while fixing the viewing angle to different values.

As described above with respect to FIG. 13, when the prism 22 is facing the observer O, the back facet 56 (the facet at display cover 16 on the concaved, curved surface) is angled with respect to the plane of display panel 12. An angle of incidence α on the back facet 56 changes because of the concave surface, as indicated by arrow A. For the same deflection, the ray angle on the front facet 50 increases as the angular displacement of the prism increases. Consequently, the negative viewing angles for which total internal reflection occurs will be reduced. Accordingly, the angle φ between a tangent 85 to the edge of the curved portion of the display cover relative to a plane 87 of the display panel 12 should be kept as small as possible.

Example 1

In the present example, the angle φ of the display cover tangent at the edge of the display cover was 10 degrees, and a maximum gap $G_A$ at the edge of 10 mm. The prism angle θ linearly decreased from 65° to 0° over a distance L of 14 mm. The bezel width W of the display device was 4 mm. A viewing angle range where the bezel is invisible was observed to be between about −20° to about +30°.

Figure 21:
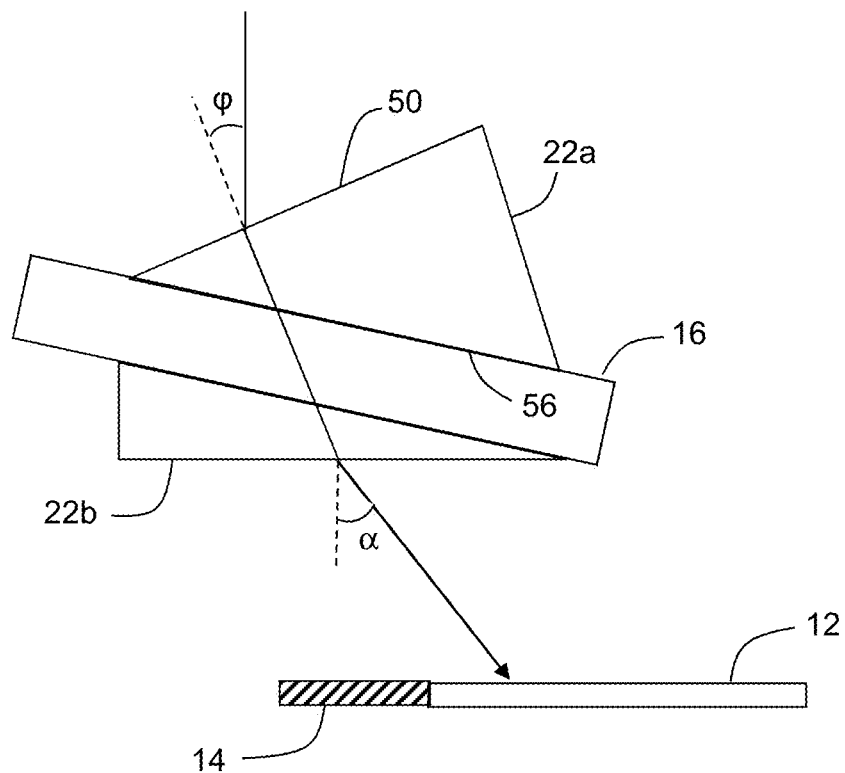
FIG. 21 is a schematic view of a portion of a display panel and a bezel, and a display cover wherein the display cover comprises prisms on both sides of the display cover.

As stated above, for a concave curvature, total internal reflection may be more prevalent, because the slope of the cover glass increases the angle of incidence on the exit face of the prisms 22. In some embodiments, the increased angle of incidence may be avoided by adding a second array of prisms to the back surface (i.e., second surface) of the display cover 16 (facing display panel 12) so that the back facets 56 of the prisms 22 can be made parallel to the plane of the display panel 10, as shown in FIG. 21. In FIG. 21 single front face prism of the first array of prisms is labeled by reference numeral 22a, and a single backside prism of the second array of prisms is labeled by reference numeral 22b. In this manner, both the entrance incident angle α and exit incidence angle φ may be controlled, resulting in a flat display cover behavior. Note, however, that when superimposing two prism arrays with similar spatial periods, visible moiré effects may occur. Consequently, different spatial frequencies may be selected for the two prism arrays so that the moiré effects occur at extremely high spatial frequencies. Additionally, randomizing the position of the prisms may also aid in eliminating periodic image defects.

Figure 22:
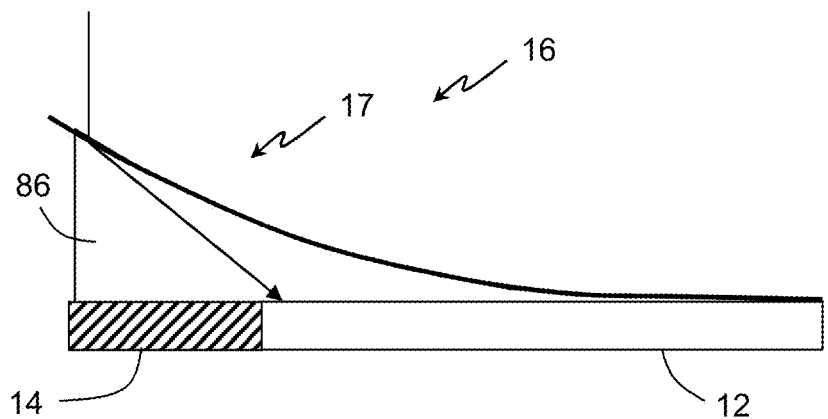
FIG. 22 is a schematic view of a portion of a display panel and a bezel, and a display cover comprising a curved portion, wherein a portion of the gap between the display cover and the display panel is filled with a polymer material (e.g. epoxy)
Figure 23:
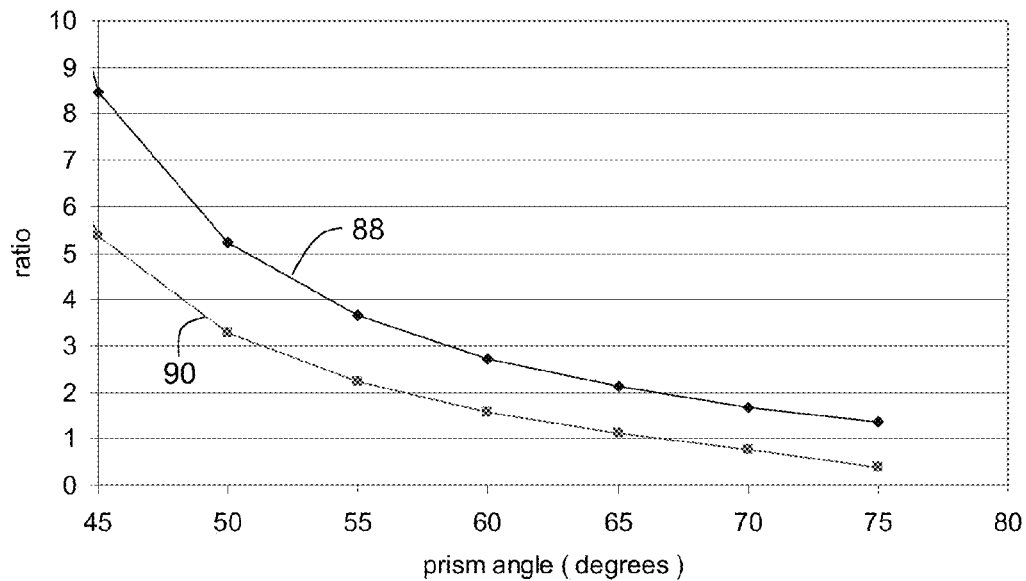
FIG. 23 is a graph of the gap-bezel width ratio as a function of prism angle for a filled gap and an unfilled gap.

Referring now to FIG. 22 in some embodiments, a plastic material 86 (e.g. an epoxy) may be provided by injection molding on the back surface of the curved display cover 16. As shown in FIG. 22, the output is made parallel to the display which, for total internal reflection is a much better situation. Nevertheless, when a gap exists between the display cover 16 and the display panel 12, both facets of the prisms contribute to light bending. With plastic or epoxy filling, only the front face contributes, leading to the need for an increased gap $G_A$. FIG. 23 depicts a plot of the gap-bezel width ratio $G_A/W$ as a function of prism angle θ that may be needed to keep a bezel-free impression up to a viewing angle of +30°. As shown by the plot of FIG. 23, with a prism angle of 55°, the gap/bezel width ratio is about 4 when the gap is filled with an epoxy (curve 88) and about 2 when the gap is filled with air (curve 90).

In some embodiments, the image can be completely blurred at the edges without a significant perceived distraction to the observer. First, for real images, such as movies, there is typically little information at the edges of the image, and most of the action is concentrated at the central region of the display device. Also, observers tend to concentrate their attention at the center of the image, leaving the edges to their peripheral vision.

Figure 24:
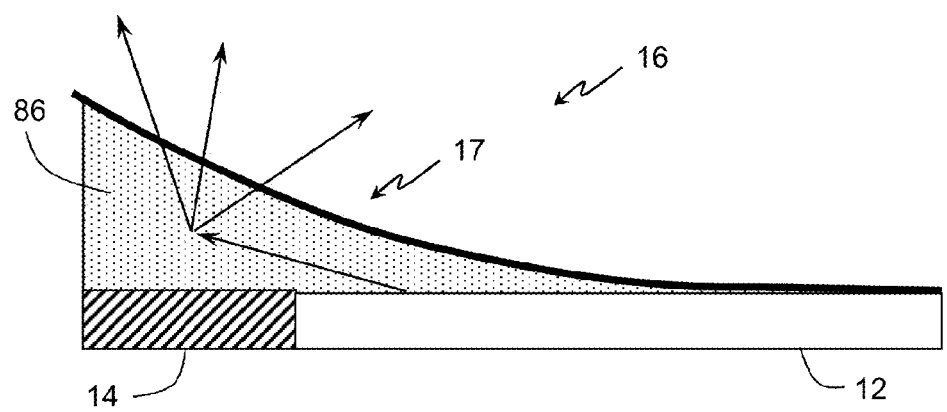
FIG. 24 is a schematic view of a portion of a display panel and a bezel, and a display cover comprising a curved portion, wherein a portion of the gap between the display cover and the display panel is filled with a polymer material (e.g. epoxy), wherein the polymer material comprises particulate scattering particles.

Accordingly, although Lambertian surface diffusers seem to give interesting results, a surface diffuser gives the edges a white appearance due to scattering of ambient light. In addition, reducing the gap to <10 mm tends to decrease the brightness of the image. In some embodiments, as shown in FIG. 24, the haze can be eliminated by filling the gap with an epoxy 86 comprising diffusing particles dispersed therein, wherein the particles perform as scattering centers. By designing the scattering centers so that backward scattering is minimized, the haze may be avoided. It is assumed the mean free path length associated with the scattering is greater than the thickness of the epoxy so that multiple scattering events do not occur. In addition, the image gradually progresses from non-blurry to blurry without an abrupt jump. Further, adjusting some of the backlight parameters can the lower brightness problem. For example, typically some of the light emitted by the backlight light source (e.g. light emitting diodes) is not in a total internal reflection mode so that it leaks from the light guide plate at the very edge of the plate. Instead of baffling that light, the light could be directed to the diffuser, increasing the image brightness at the edge.

As explained above, to minimize gap $G_A$, the prism angle θ should be increased. However, this may lead to image artifacts, even when viewing at an incidence normal to the display panel. As an example, for a flat cover glass design with prism angle θ starting at 55°, it is expected that 40% of the light is deviated in the wrong direction.

Figure 25:
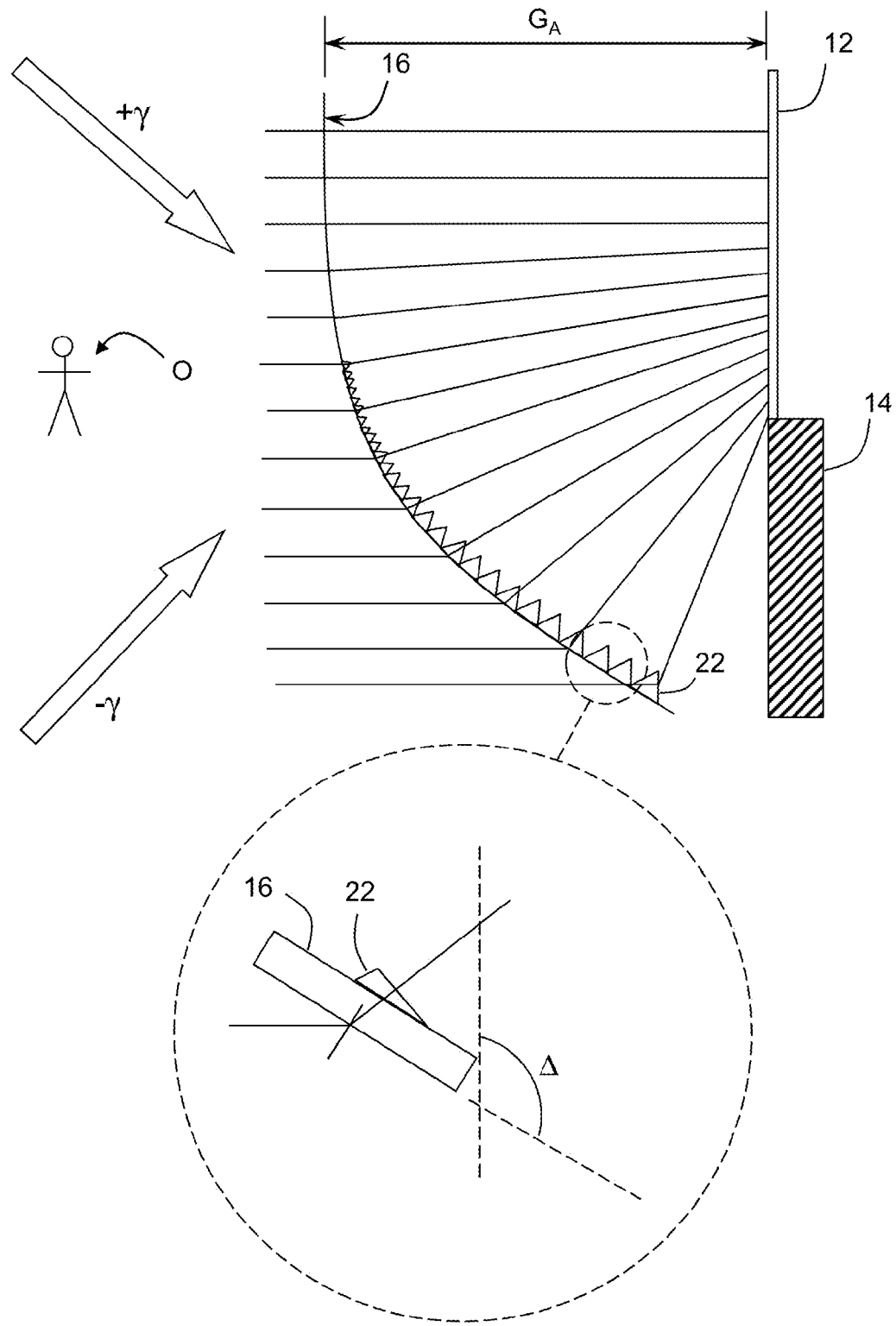
FIG. 25 is a schematic view of a portion of a display panel and bezel, and a display cover, wherein the display cover comprises a curved portion that curves away from the display panel.

FIG. 25 depicts an embodiment wherein the display cover 16 has a convex curved perimeter portion at the edge. That is, the curved portions curve outward, away from display panel 12. FIG. 25 depicts light rays as hitting the convex curved portion at normal incidence. An array of prisms 22 is positioned on a second surface of the display cover 16 that faces the display panel 12. The light rays are incident on the prisms on the display panel side of the display cover 16 at a large angle, introducing a very large ray deflection. Also, because there are no prisms on the observer side of the display cover 12, light rays incident on the wrong prism facet are not a concern. Consequently, large ray deflections may be tolerated without affecting the image (ignoring magnification and/or banding) in this embodiment.

Prism angles θ on the display panel side of display cover 16 are defined such that the angle of the light ray on the front facet is close to normal incidence when the viewer is also at normal incidence. By doing so, the negative viewing angle at which the bezel 14 is still invisible can be increased and total internal reflection avoided. Most of the light ray deflection is introduced by the observer side of the display cover 12 itself, where there is no prism. The image, at least at normal incidence, will be substantially free of any artifacts, although not necessarily comprise a smaller gap $G_A$.

Figure 26:
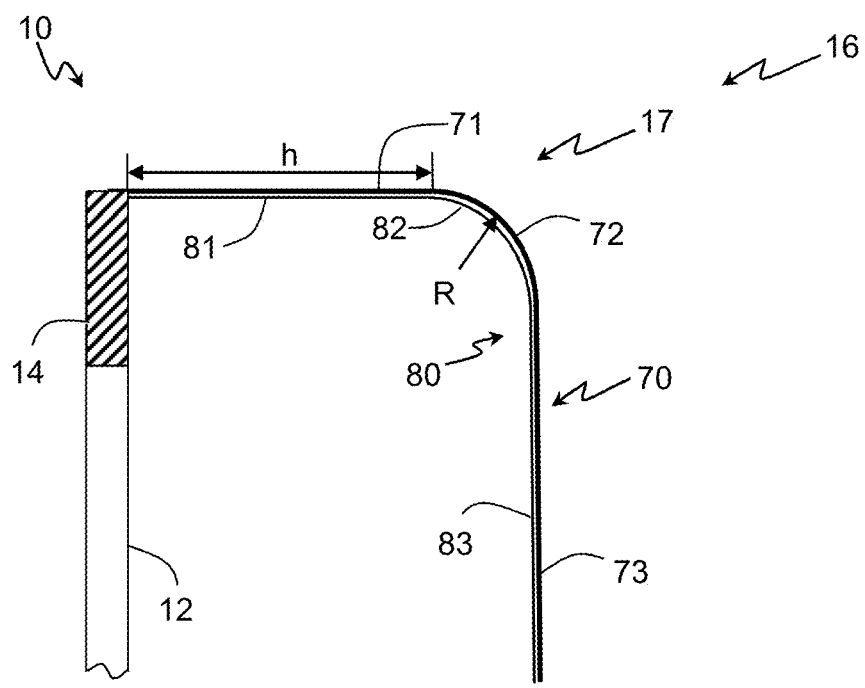
FIG. 26 is a schematic view of a portion of a curved bezel-concealing display cover having first and second straight portions and a curved portion.

Referring now to FIG. 26, the bezel-concealing display cover 16 comprises a shaped cover glass 70 and an angular filter film 80 adhered thereto. The cover glass 70 has a first straight portion 71 at a height h that provides a gap between the bezel 14 and display panel 12 of the display device 10. The cover glass 70 further comprises a curved portion 72 having a radius R, and a second straight portion 73 that extends over a center portion of the display device 10. In one embodiment, the cover glass 70 is chemically strengthened glass. The angular filter film 80, which includes the array of prisms as described above, may be adhered to an underside of the cover glass 70 (i.e., the second surface), and similarly comprises a first straight portion 81, a curved portion 82 having prisms, and a second straight portion 83. In some embodiments, the angular filter film 80 is only provided at the curved portion 82. In the illustrated embodiment, the prisms face the display panel 12, as depicted in FIG. 25, such that the flat portion of the angular filter film 80 is adhered to the cover glass 70. In other embodiments, an index-matching adhesive may be utilized to adhere the angled side of the angular filter film 80 to the cover glass 70, or to adhere an angular filter film that has prisms on each side.

As described above, the angle of the prisms should be at a maximum close to the edge of the display device 10 and falling to a minimum (e.g., zero) at some distance from the edge of the display device 10. It is noted that at some viewing angles, the curved portion may cause the prisms to operate in a total internal reflection regime, thereby causing portions of the bezel-concealing display cover 16 to look like a mirror. As stated above, one way to account for total internal reflection, as well as for increasing the viewing angle range, is to optimize the angle variation profile of the prisms in the curved portion 82 of the angular filter film 80 (or in the curved portion 72 of the cover glass 70 in embodiments where the prisms are formed directly into the glass). Described below are several examples of a display cover 16 having a curved perimeter portion 17. The examples below are limited to cases where the prisms are facing the display device 10, the size of the bezel to be concealed is 3 mm, and the maximum viewing angle is 40°.

Example 2

Figure 27:
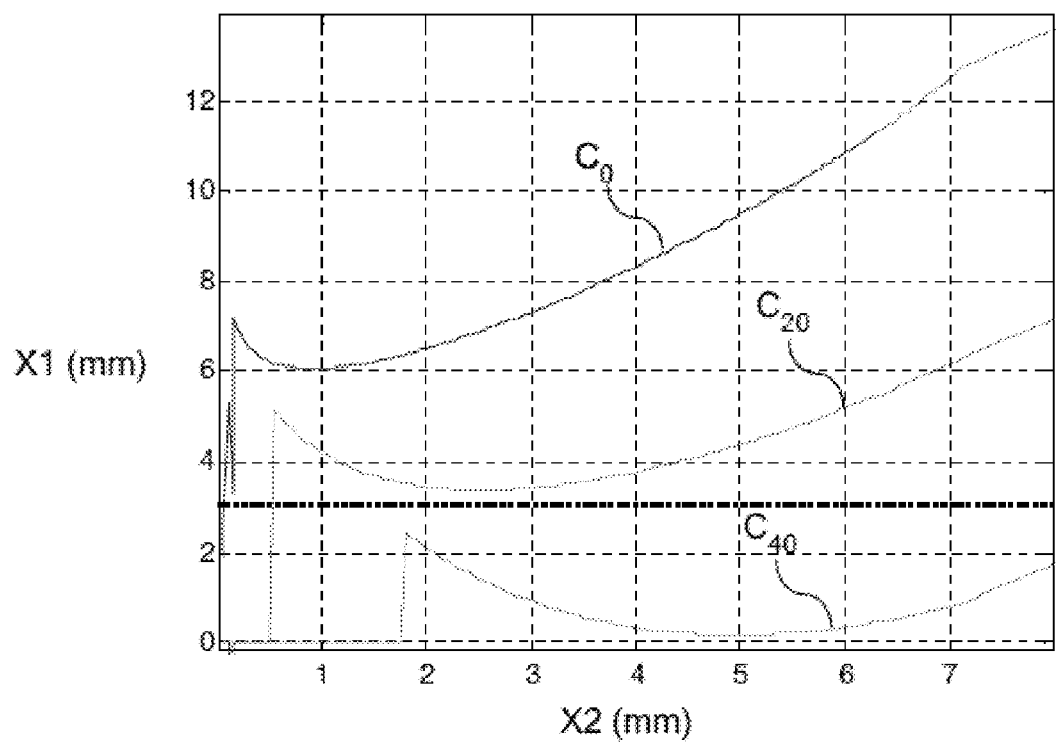
FIG. 27 is a graph plotting a position on the display device versus a position on the bezel-concealing display cover for various viewing angles, where the prisms have an angle of 32°.
Figure 28:
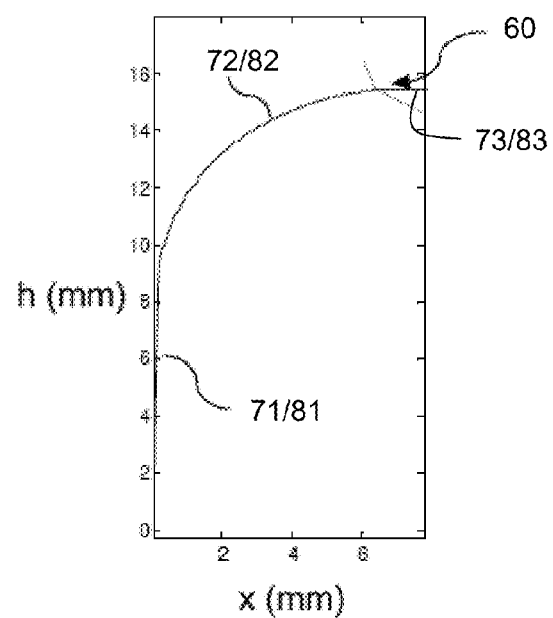
FIG. 28 is a graph depicting a profile of the bezel-concealing display cover plotted in FIG. 27.

FIGS. 27 and 28 depict results of a simulation wherein the angle of prisms is constant at 32°, the height h is 8.5 mm, and the radius R is 7.0 mm. In FIG. 27, the vertical axis is X1, which is the position on the display panel 12 in millimeters. The horizontal axis is X2, which is the position where the light rays hit the display cover 12. Curve $C_0$ is a 0° viewing angle γ, curve $C_{20}$ is a 20° viewing angle γ, and curve $C_{40}$ is a 40° viewing angle γ. FIG. 28 shows a profile of the bezel-concealing display cover 12 and propagation of a light ray 60. The graph of FIG. 27 shows that, in this configuration, the bezel 14 remains invisible only for vision angles below 20° since the position on the display device remains larger than the 3 mm bezel size (indicated by the dashed-dotted line).

Example 3

Figure 29:
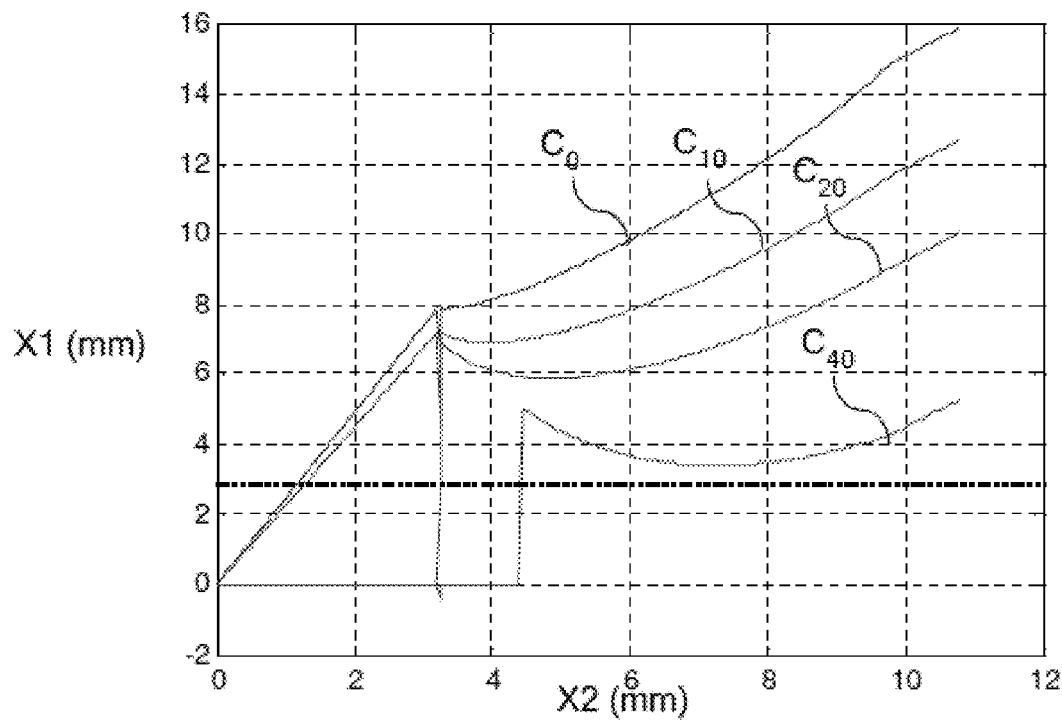
FIG. 29 is a graph plotting a position on the display device versus a position on the bezel-concealing display cover for various viewing angles, where the prisms have an angle of 32°, and a straight portion of the bezel-concealing display cover is angled at 20°.
Figure 30:
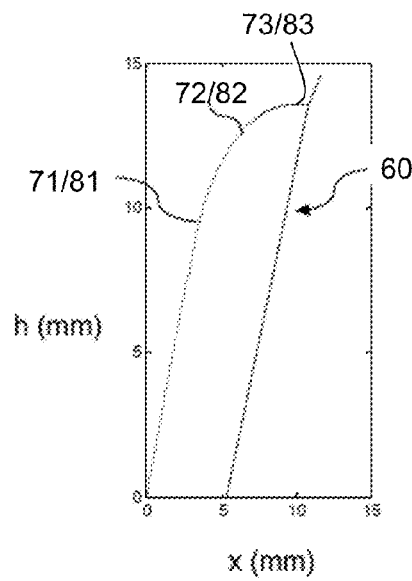
FIG. 30 is a graph depicting a profile of the bezel-concealing display cover plotted in FIG. 29.

FIGS. 29 and 30 depict results of a simulation where the first straight portion 71/81 is set at a 20° angle. The graph of FIG. 29 also includes curve $C_{10}$, which corresponds to a 10° viewing angle. In this case, the bezel 14 becomes visible through the straight portion 71/81 when viewing at normal incidence. However, the prisms introduce a demagnification such that the size of the bezel is nearly decreased by a factor of three. This demagnification, added to some confusion introduced by the curvature of the bezel-concealing display cover 16, makes it very hard for an observer to detect the bezel 14. Accordingly, angling the first straight portion 71/81 makes the bezel 14 invisible up to a 40° viewing angle. It is noted that the bezel is invisible at a viewing angle where X1=0 due to an invisibility pool effect.

Example 4

Figure 31:
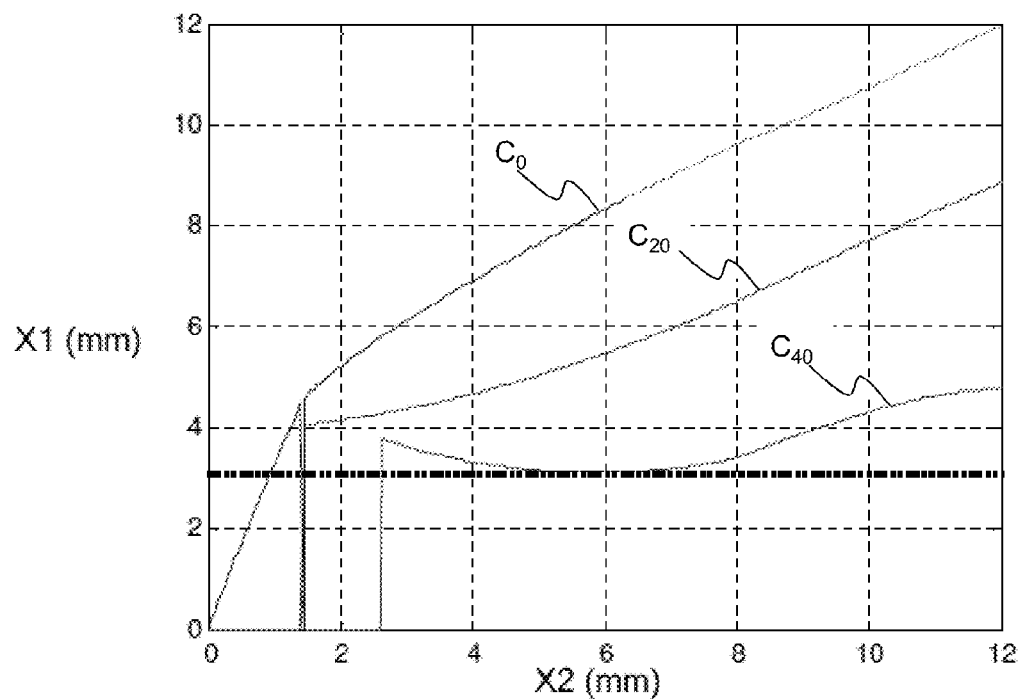
FIG. 31 is a graph plotting a position on the display device versus a position on the bezel-concealing display cover for various viewing angles, where the prisms have a varying angle, and a straight portion of the bezel-concealing display cover is angled at 20°.
Figure 32:
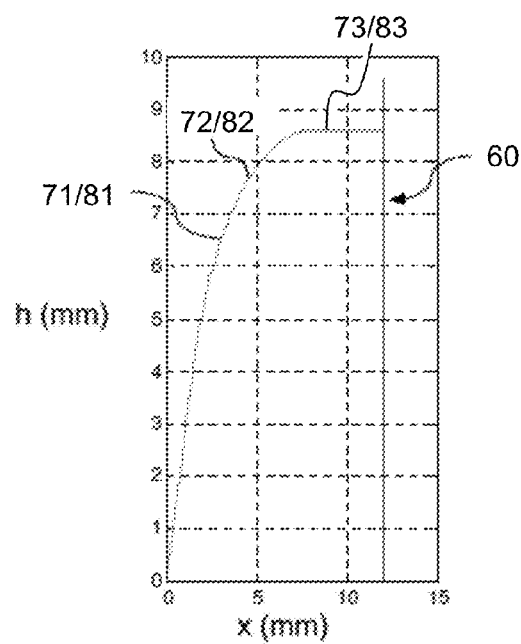
FIG. 32 is a graph depicting a profile of the bezel-concealing display cover plotted in FIG. 31.

Another optimization may include providing a prism array having varying prism angles. FIGS. 31 and 32 illustrate a case where the prism angle θ varies linearly from 60° at the very edge of the bezel-concealing display cover (i.e., maximum prism angle θ) to zero 12 mm away from the edge (i.e., L=12 mm). The height h of the straight portion may be reduced, resulting in an 8.5 mm air gap. As may be seen, the curves of FIG. 31 are similar to the curves of FIG. 29, although the air gap has been significantly reduced.

Figure 33:
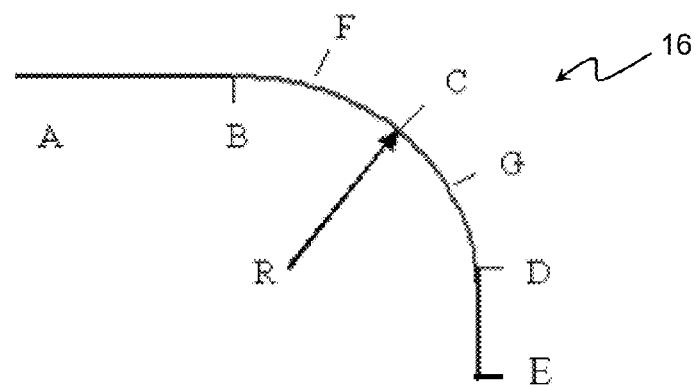
FIG. 33 is a schematic view of a profile of a curved prism portion of a curved bezel-concealing display cover.
Figure 34:
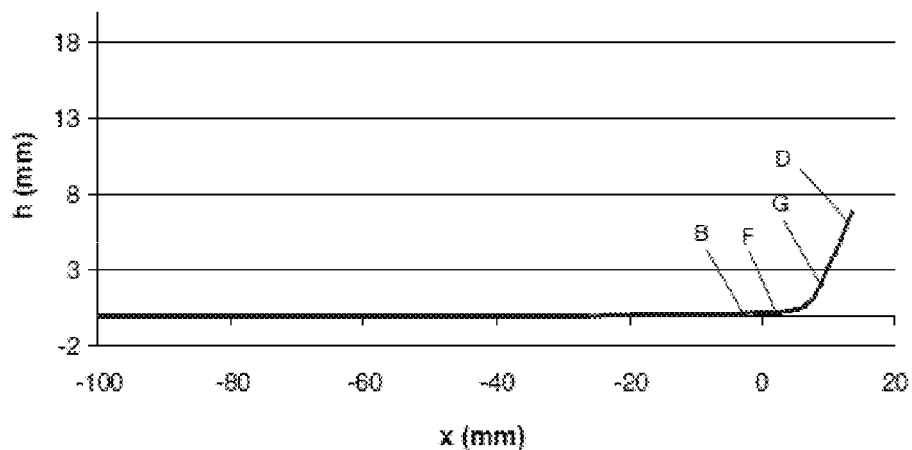
FIG. 34 is a graph depicting a profile measurement of a curved bezel-concealing display cover.
Figure 35:
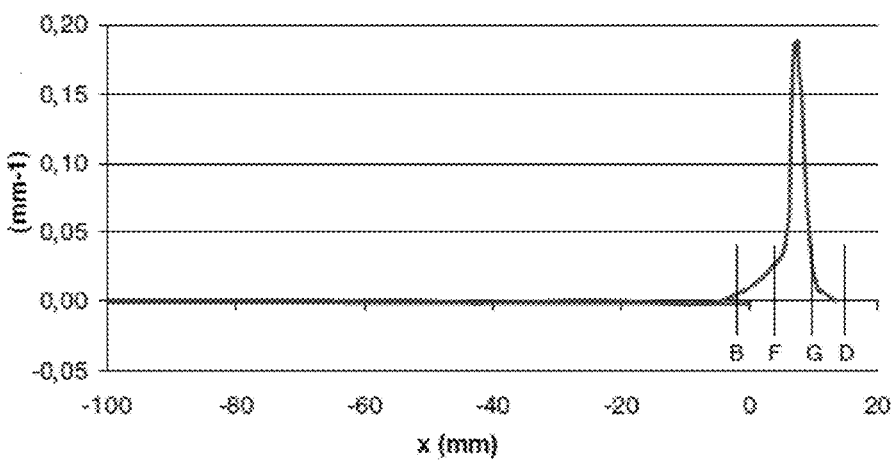
FIG. 35 is a graph depicting a local curvature evolution of the curved bezel-concealing display cover depicted in FIG. 34.

FIG. 33 depicts an exemplary bend profile of a shaped bezel-concealing display cover 16. A flat, uniform central portion covers most of the display surface A-B (e.g., 250 mm to 1650 mm). A curved portion presents a continuum of radii ranging from 0 in B-D, to a maximum of R in C. The radius of curvature may be sensibly unchanged and close to R from F to G. As an example and not a limitation, typical values for R may be 3 to 10 mm. A flat section D-E extends from the bended section. The length of this flat section can vary, such as from 2 to 10 mm, for example. FIG. 34 depicts an exemplary profile measurement of a curved bezel-concealing display cover 16, while FIG. 35 depicts a local curve evolution of the profile depicted in FIG. 34.

The cover glass 270 may be fabricated by any number of appropriate three-dimensional glass forming techniques. For example, U.S. patent application Ser. No. 13/303,685, filed on 23 Nov. 2011 and incorporated herein by reference in its entirely, describes a suitable method. Generally, a glass sheet is first cut and the edges finished to the developed size of the final display cover to be obtained. This glass preform can be divided into at least two regions: a central region that will remain flat, and at least one region along an edge of the glass preform that will be permanently deformed during the shaping process to obtain the expected three dimensional design. Typically, two opposing edges are deformed. The glass preform is positioned on a flat setter member (e.g. having a shape complimentary to the shape to be induced into the glass sheet). The central region of the glass sheet is supported by the setter, with edge or edges of the glass overhanging the setter. The setter and the glass sheet are globally heated (for example in a lehr or in an oven) to a preheating temperature between the strain point and the annealing point of the glass and corresponding to a viscosity in a range from about $1 \times 10^{10}$ Poise and $1 \times 10^{15}$ Poise. Next, the edge or edges of the glass sheet to be deformed (bent into a curved shape) are locally heated, using for example radiant heaters, to a temperature corresponding to a viscosity in a range between $1 \times 10^8$ Poise and $10^9$ Poise. As an example and not a limitation, for Corning code 2319 glass, the preheating temperature can be in between about 600° C. and about 660° C., and the local heating temperature between about 750° C. and about 800° C. The local heater is configured to heat the edge or edges so that the thermal (or viscosity) profile along a cross-section of edge or edges will enable the required deformation (curvature profile). When the required viscosity level in the region of the edges is reached, the glass sheet is deformed with a curvature corresponding to the imposed thermal profile. This deformation can be obtained either by gravity only (slumping) or by employing one or more actuators that contact the regions of the glass sheet to be deformed. The one or more actuators can impose the trajectory of the glass edge to a final position. Once the desired bend is obtained, the whole system is cooled down to room temperature.

Alternative methods of forming curvature in selected regions of the glass sheet may also be employed. For example, the glass sheet may be pressed between two complementary molds, or separately-shaped edges may be assembled on a flat glass sheet that forms the central region. In another method, forming of the edges can be accomplished during a drawing process on a downdraw glass ribbon-forming apparatus by local edge rolling members as described in WIPO publication WO12/004,625, filed on 8 Jul. 2010 and incorporated herein by reference in its entirety. Other methods include glass sheet rolling methods, and shaping on a suitably-configured support and polishing.

An iterative process that can automatically calculate an ideal display cover shape, as well as the prism angles, according to one embodiment is now described. To start the iterative process, the following input parameters are defined: the positive viewing angle at which the bezel should remain invisible, an acceptable image magnification factor M, and the angle $\Delta_0$ (see FIG. 25) of the display cover at the edge of the image.

The iterative process starts at X2=0, where X2 is the perpendicular distance from the edge of the display cover toward the central region along L, and an observer viewing the image at a viewing angle γ such that the bezel remains invisible is considered. An initial angle $\Delta_0$ is selected, where $\Delta$ is the angle of a tangent to the convex curvature of the curved portion of the display cover edge relative to a plane of the display panel (as shown in FIG. 25). A deflection at the observer side of the display cover is calculated, the distance $y_0$ between the image and the display cover that insures the bezel remains invisible is determined.

Next, the prism angle θ for the prisms on the display panel side of the display cover is calculated such that the light ray is perpendicular to the back facet of the prism at normal incidence. The process then moves to the next position X2=X2+dx, where dx is some small distance. Knowing the display cover angle $\Delta_0$, a new position $y=y_0+dx*\tan(\Delta_0)$ is determined. Knowing the desired image magnification factor M, the location where it is desired for the beam to hit the display panel can be calculated. Thus, an amount of deflection that is needed to meet that desired target is calculated. From this calculated deflection value, the new display cover angle $\Delta$ that will provide that deflection may be calculated. With the new value of α, which is the angle of light within the glass, the prism angle θ on the back face of the display cover such that the beam is perpendicular to the back facet at normal incidence is calculated.

Figure 36:
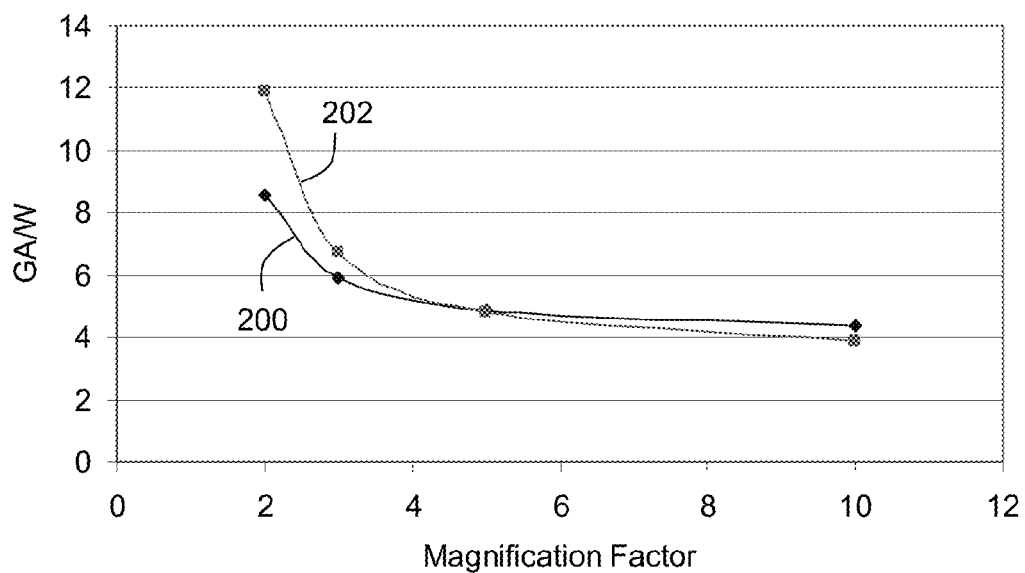
FIG. 36 is a graph of gap-bezel width ratio and the L/bezel width ratio as a function of magnification factor for an outwardly curved display cover edge portion for a set viewing angle at which the bezel remains invisible at 30°.

FIG. 36 shows the evolution of gap $G_A$ as a function of the magnification factor M when fixing the viewing angle γ at which the bezel remains invisible to 30°, and the starting cover glass angle ($\Delta_0$) to 80°. Curve 200 denotes the gap/bezel width ratio, whereas curve 202 denotes the ratio of L to the bezel width.

Applying the foregoing process leads to relatively large gaps $G_A$ and large length over which prism angles θ decelerate. As an example, for a magnification of about 3, both parameters are about 6 to 7 times the bezel width W. When simulating these designs, such solutions remain free of total internal reflection for extreme negative viewing angles, such as −75°. Moreover, the preceding process includes a constraint in that one may calculate the prism angle θ for prisms on the display panel side of the display cover such that the rays are perpendicular to the back facet when looking at the display panel at a viewing angle γ normal to the display panel. Alternatively, another viewing angle can be selected, such as a negative viewing angle (e.g. −50°), and ensure the design remains free of total internal reflection up to that limit.

By applying the foregoing process, a unique display cover shape can be calculated, as well as a prism angles θ that give the best visual result for three criteria: (1) banding, wherein the magnification factor remains lower than a given limit within a given viewing angle; (2) that the bezel remains invisible for positive viewing angles up to a given limit; and (3) wherein the prisms remain outside the total internal reflection regime up to a given negative viewing angle limit.

Figure 37:
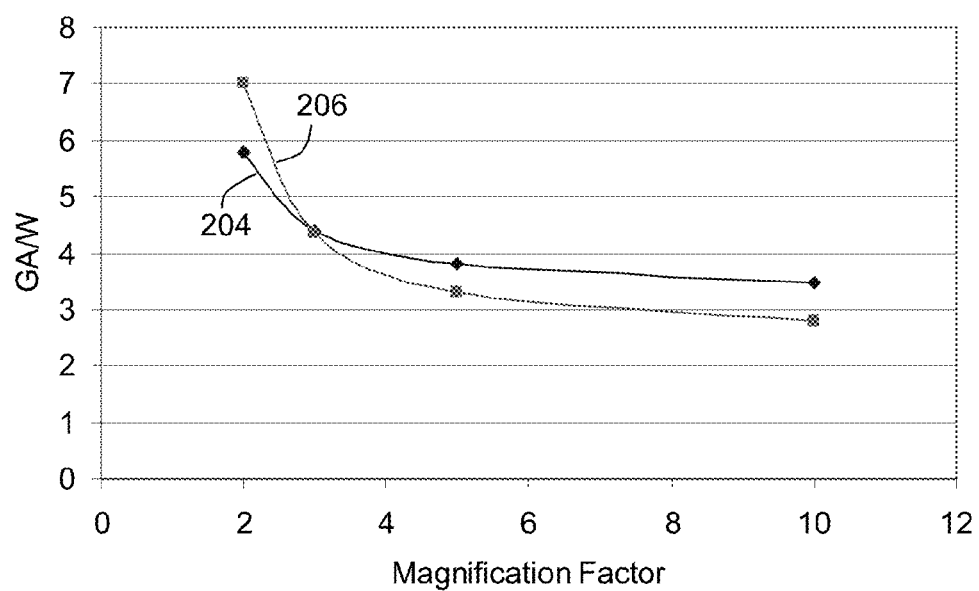
FIG. 37 is a graph of gap-bezel width ratio and the L/bezel width ratio as a function of magnification factor for an outwardly curved display cover edge portion for a negative viewing angle of −50°.

FIG. 37 shows the gap $G_A$ to bezel width W ratio and the prism length L to bezel width W ratio as functions of the image magnification factor. The defect-free viewing angle was varied from −50° (for total internal reflection) to +30 degrees (for bezel visibility). Assuming that a magnification factor of 3 is the highest attainable, the preceding ratios are on the order of 4.4. Curve 204 denotes the gap/bezel width ratio, whereas curve 206 denotes the ratio of L to the bezel width.

The variation of the gap $G_A$ to bezel width ($G_A$/W) ratio as a function of the minimum negative angle at which total internal reflection appears and also as a function of the image magnification factor were plotted for a maximum positive angle at which bezel remains invisible, fixed at 30°, but the result was a limited design space. On one hand, using a magnification factor larger than 3 leads to unacceptable levels of banding and, when trying to extend the viewing angle more negative than −50 degrees, the gap $G_A$ increases significantly.

Figure 38:
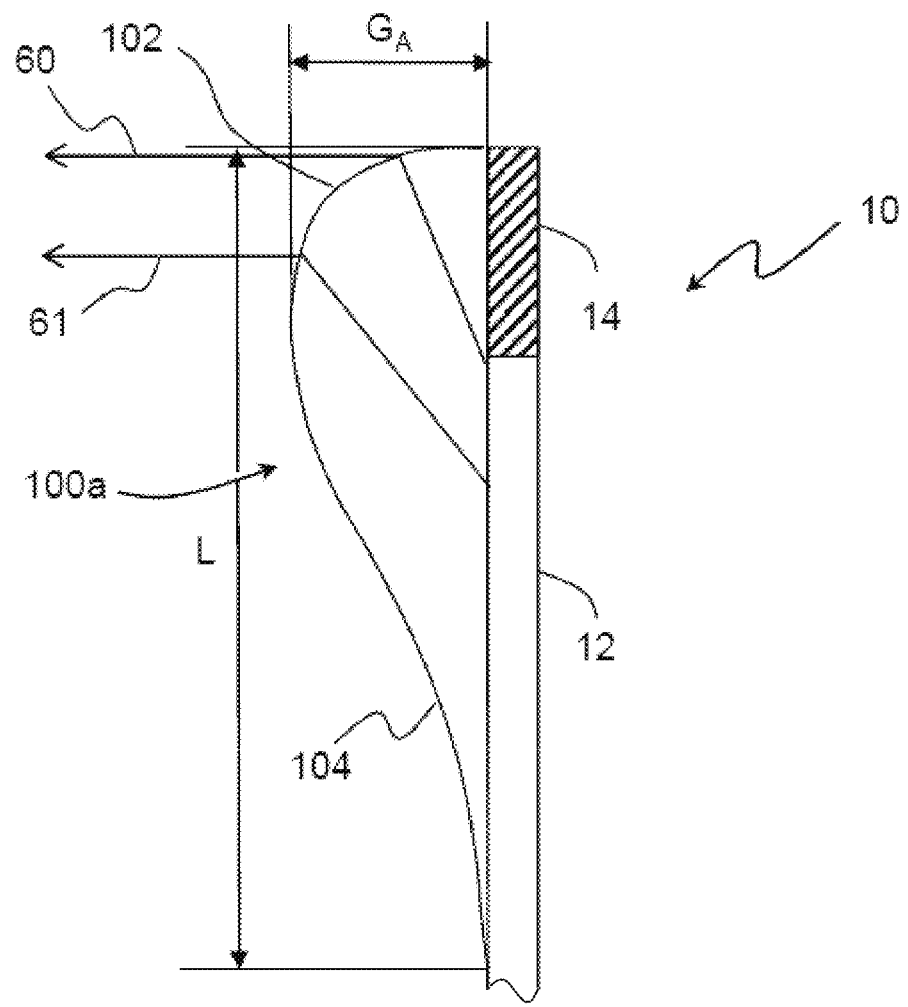
FIG. 38 is a schematic view a curved bezel-concealing display cover having a convex curved portion and a concave curved portion.

FIG. 38 depicts a bezel-concealing display cover 100a that only covers the bezel(s) 14 and a portion of the display panel 12 of the display device that is in close proximity to the bezel(s) 14. FIG. 38 is a profile view of a bezel-concealing display cover 100a coupled to a top bezel 14 of a display device 10. The curved bezel-concealing display cover 100a comprises a transparent material (e.g., glass or plastic) having micro-replicated prisms to bend the light emitted by the display device 10 such that the light affected by the bezel-concealing display cover 100a produces an image over the bezel(s) 14 (e.g., light rays 60 and 61). The exemplary bezel-concealing display cover 100a depicted in FIG. 38 comprises a convex curve portion 102 that curves first outward away from the display device 10 and then inward toward the display device 10. The convex curve portion 102 transitions into a concave curve portion 104 that curves toward the display panel 12 of the display device 10. The bezel-concealing display cover 100a may then cover the entire remaining portion of the display panel 12 with substantially no gap, or terminate such that the remaining portion of the display panel 12 is not covered by the bezel-concealing display cover 100a. A maximum gap $G_A$ between the bezel-concealing display cover 100a and the display device 10 occurs at the peak of the convex curve portion 102.

Figure 39:
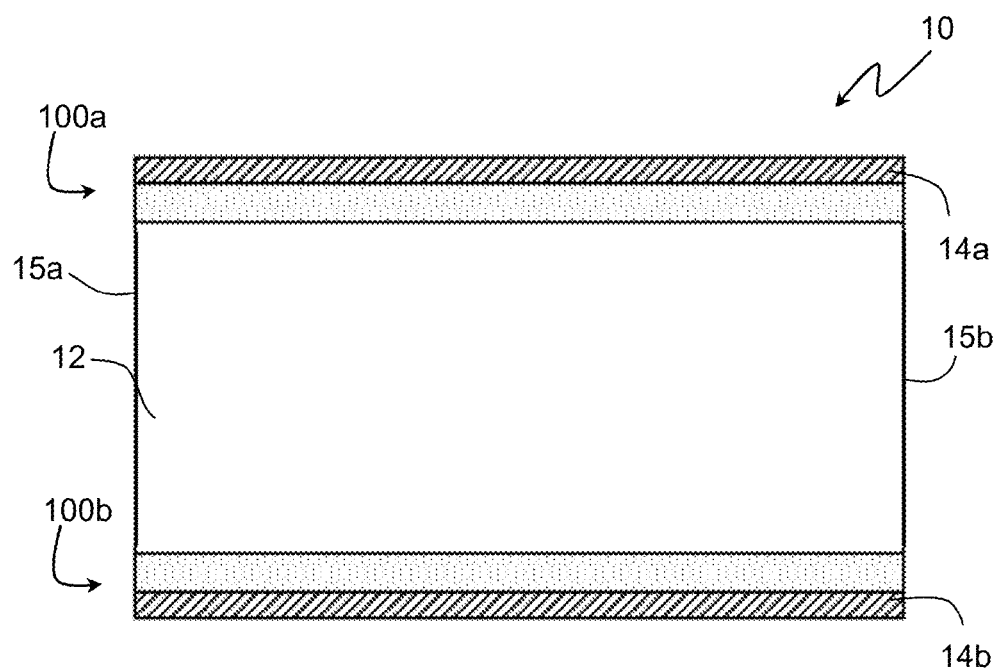
FIG. 39 is a schematic view of a display device and two curved bezel-concealing display covers configured as depicted in FIG. 38 coupled thereto.

Referring now to FIG. 39, an exemplary display device 10 having only two bezels including a top bezel 14a and a bottom bezel 14b is illustrated. Sides 15a and 15b of the display device are bezel-free. The top bezel 14a and the bottom bezel 14b are covered by a top bezel-concealing display cover 100a and a bottom bezel-concealing display cover 100b, respectively. The top and bottom bezel-concealing display covers 100a, 100b, which may be configured as those depicted in FIG. 38, may be attached to the top and bottom bezels 14a, 14b, respectively, by any method including, but not limited to, magnetic engagement, mechanical engagement, and use of an adhesive.

For the purposes of describing and defining embodiments of the present disclosure it is noted that the terms "substantially," "approximately," and "about" are utilized herein to represent the inherent degree of uncertainty that may be attributed to any quantitative comparison, value, measurement, or other representation.

It is noted that recitations herein of a component of a particular embodiment being "configured" in a particular way, or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

It is also noted that the use of the phrase "at least one" in describing a particular component or element does not imply that the use of the term "a" in describing other components or elements excludes the use of more than one for the particular component or element. More specifically, although a component may be described using "a," it is not to be interpreted as limiting the component to only one.

While particular embodiments have been illustrated and described herein, it should be understood that various other changes and modifications may be made without departing from the spirit and scope of the claimed subject matter. More specifically, although some aspects of the embodiments described are identified herein as preferred or particularly advantageous, it is contemplated that the claimed subject matter is not necessarily limited to these preferred aspects.

The invention claimed is:

1. A bezel-concealing display cover for coupling to a display device comprising a bezel and a display panel, the bezel-concealing display cover comprising:
   a curved perimeter portion comprising a first surface and a second surface, wherein the curved perimeter portion is configured to be offset from the display device by a varying gap $G_A$ when the bezel-concealing display cover is coupled to the display device, wherein the curved perimeter portion comprises a concave curved portion, wherein the gap $G_A$ between the concave curved portion and the display device decreases from an edge of the concave curved portion toward a central region of the bezel-concealing display cover;
   a first array of prisms disposed on the first surface of the curved perimeter portion, the first array of prisms extending toward the central region of the bezel-concealing display cover to a distance L measured from an edge of the bezel-concealing display cover toward the central region of the bezel-concealing display cover, wherein each prism of the first array of prisms has a prism angle θ; and
   a second array of prisms disposed on the second surface of the curved perimeter portion, wherein:
      a spatial frequency of individual prisms of the first array of prisms is different than a spatial frequency of individual prisms of the second array of prisms; and
      the first array of prisms, the second array of prisms, and the curved perimeter portion are configured to shift a portion of an image proximate the bezel produced by the display panel such that the shifted portion of the image appears over the bezel to an observer.

2. The bezel-concealing display cover according to claim 1, wherein the gap $G_A$ between the concave curved portion and the display device decreases in a direction from the edge of the concave curved portion toward the central region of the bezel-concealing display cover to the distance L.

3. The bezel-concealing display cover according to claim 1, further comprising a central region bounded by the curved perimeter portion, wherein the gap $G_A$ between the central region and the display panel is about zero when the bezel-concealing display cover is coupled to the display device.

4. The bezel-concealing display cover according to claim 1, wherein a tangent to the curved perimeter portion at the edge of the curved perimeter portion has an angle relative to a plane of the display panel equal to or less than 20°.

5. The bezel-concealing display cover according to claim 1, wherein the first array of prisms is positioned on the first surface of the curved perimeter portion, and the first surface of the curved perimeter portion faces the observer.

6. The bezel-concealing display cover according to claim 1, wherein the curved perimeter portion further comprises a convex curve portion.

7. The bezel-concealing display cover according to claim 6, wherein:
   the convex curve portion extends from the edge of the display device proximate the bezel when the bezel-concealing display cover is coupled to the display device such that a maximum gap $G_A$ occurs within the convex curve portion; and
   the concave curve portion extends from the convex curve portion such that there is no gap at a termination of the concave curve portion.

8. A bezel-concealing display cover for coupling to a display device comprising a bezel and a display panel, the bezel-concealing display cover comprising:
- a curved perimeter portion comprising a first surface and a second surface, wherein the curved perimeter portion is configured to be offset from the display device by a varying gap $G_A$ when the bezel-concealing display cover is coupled to the display device, wherein the curved perimeter portion comprises a convex curved portion, wherein the gap $G_A$ between the convex curved portion and the display device increases from an edge of the convex curved portion toward a central region of the bezel-concealing display cover; and
- a first array of prisms on at least one of the first surface or the second surface of the curved perimeter portion, the first array of prisms extending toward the central region of the bezel-concealing display cover to a distance L measured from an edge of the bezel-concealing display cover toward the central region of the bezel-concealing display cover, wherein:
  - each prism of the first array of prisms has a prism angle $\theta$, wherein the prism angle $\theta$ of the first array of prisms decreases toward the central region of the bezel-concealing display cover from a maximum prism angle $\theta_1$; and
  - the first array of prisms and the curved perimeter portion are configured to shift a portion of an image proximate the bezel produced by the display panel such that the shifted portion of the image appears over the bezel to an observer.

9. The bezel-concealing display cover according to claim 8 further comprising a first straight portion and a second straight portion, wherein:
- the first straight portion extends from a surface of the bezel when the bezel-concealing display cover is coupled to the display device;
- the convex curved portion extends from an end of the first straight portion, wherein the first array of prisms is located at the convex curved portion; and
- the second straight portion extends from an end of the convex curved portion and parallel to the display panel when the bezel-concealing display cover is coupled to the display device.

10. The bezel-concealing display cover according to claim 9, wherein the first straight portion is angled with respect to a plane perpendicular to the bezel when the bezel-concealing display cover is coupled to the display device.

11. The bezel-concealing display cover according to claim 9, wherein the first array of prisms is positioned on the second surface of the curved perimeter portion, and the second surface of the curved perimeter portion faces the display panel.

12. A display device comprising:
- a bezel-concealing display cover comprising:
  - a curved perimeter portion comprising a first surface and a second surface;
  - a central region bounded by the curved perimeter portion;
  - a first array of prisms disposed on at least one of the first surface of the curved perimeter portion, wherein the first array of prisms extends from an edge of the bezel-concealing display cover toward the central region of the bezel-concealing display cover to a distance L measured from the edge of the bezel-concealing display cover toward the central region of the bezel-concealing display cover; and
  - a second array of prisms disposed on the second surface of the curved perimeter portion, wherein a spatial frequency of individual prisms of the first array of prisms is different than a spatial frequency of individual prisms of the second array of prisms;
- a backlight;
- a display panel, the display panel positioned between the backlight and the bezel-concealing display cover such that a gap $G_A$ is present between the display panel and the second surface of the bezel-concealing display cover, wherein the display panel is configured to display an image, the curved perimeter portion curves inward toward the display panel such that the gap $G_A$ between the display panel and the curved perimeter portion decreases from the edge of the bezel-concealing display cover toward the central region of the bezel-concealing display cover, and the gap $G_A$ is substantially zero after the distance L; and
- a bezel having a width W disposed about a perimeter edge of the display panel.

13. The display device according to claim 12, further comprising a polymer material disposed between the curved perimeter portion and at least one of the display panel or the bezel, wherein the polymer material comprises a diffusing particulate material dispersed therein.

14. A display device comprising:
- a bezel-concealing display cover comprising:
  - a curved perimeter portion and a central region bounded by the curved perimeter portion;
  - a first surface and a second surface; and
  - an array of prisms disposed on at least one of the first surface or the second surface, wherein the array of prisms extends from an edge of the bezel-concealing display cover toward the central region of the bezel-concealing display cover to a distance L measured from the edge of the bezel-concealing display cover toward the central region of the bezel-concealing display cover;
- a backlight;
- a display panel, the display panel positioned between the backlight and the bezel-concealing display cover such that a gap $G_A$ is present between the display panel and the second surface of the bezel-concealing display cover, wherein the display panel is configured to display an image, the curved perimeter portion curves outward away from the display panel such that the gap $G_A$ between the display panel and the curved perimeter portion increases from the edge of the bezel-concealing display cover toward the central region of the bezel-concealing display cover, and maximum gap $G_A$ occurs after the distance L; and
- a bezel having a width W disposed about a perimeter edge of the display panel.

15. The display device according to claim 14, wherein a prism angle $\theta$ of individual prisms of the array of prisms decreases from a maximum prism angle $\theta_1$ at the edge of the display device.

16. The display device according to claim 14, wherein the array of prisms are positioned on the second surface of the curved perimeter portion, and the second surface of the curved perimeter portion faces the display panel.

* * * * *